US010555215B2

(12) United States Patent
Kojima

(10) Patent No.: US 10,555,215 B2
(45) Date of Patent: Feb. 4, 2020

(54) MANAGEMENT APPARATUS, COMMUNICATION SYSTEM, AND ALLOCATION METHOD

(71) Applicant: FUJITSU LIMITED, Kawasaki-shi, Kanagawa (JP)

(72) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 15/648,242

(22) Filed: Jul. 12, 2017

(65) Prior Publication Data
US 2018/0041921 A1 Feb. 8, 2018

(30) Foreign Application Priority Data
Aug. 3, 2016 (JP) .................................. 2016-153059

(51) Int. Cl.
*H04L 12/709* (2013.01)
*H04W 28/08* (2009.01)
*H04W 88/18* (2009.01)

(52) U.S. Cl.
CPC .......... *H04W 28/08* (2013.01); *H04L 45/245* (2013.01); *H04W 88/182* (2013.01)

(58) Field of Classification Search
None
See application file for complete search history.

(56) References Cited

U.S. PATENT DOCUMENTS

| 8,064,514 B2* | 11/2011 | Lochbaum | H04N 7/152 348/14.01 |
| 2008/0062879 A1* | 3/2008 | Sivakumar | H04L 29/1249 370/235 |
| 2011/0040888 A1* | 2/2011 | Krishnaswamy | H04L 63/0884 709/231 |
| 2011/0296006 A1* | 12/2011 | Krishnaswamy | H04L 45/00 709/224 |
| 2012/0026870 A1* | 2/2012 | Challa | H04L 41/046 370/230 |
| 2012/0258674 A1* | 10/2012 | Livet | H04W 76/10 455/73 |
| 2013/0077501 A1* | 3/2013 | Krishnaswamy | H04L 47/193 370/252 |

(Continued)

FOREIGN PATENT DOCUMENTS

| JP | 2014-110639 A | 6/2014 |
| JP | 2014-127790 A | 7/2014 |

(Continued)

*Primary Examiner* — Nicholas Sloms
(74) *Attorney, Agent, or Firm* — Arent Fox LLP

(57) ABSTRACT

There is provided a management apparatus configured to allocate a plurality of terminals to a plurality of proxy servers, the management apparatus including a memory, a processor coupled to the memory and the processor configured to collect first line information of a first line and second line information of a second line, which are used for a terminal of the plurality of terminals, calculate a speed difference between a first line speed of the first line and a second line speed of the second line, based on line speeds in accordance with the first line information and the second line information, and allocate the terminal to a proxy server of the plurality of proxy servers, based on the speed difference.

9 Claims, 21 Drawing Sheets

(56) References Cited

U.S. PATENT DOCUMENTS

| | | |
|---|---|---|
| 2014/0153583 A1 | 6/2014 | Gouache et al. |
| 2015/0095502 A1 | 4/2015 | Le Bolzer et al. |
| 2015/0195736 A1* | 7/2015 | Liu .................. H04W 72/0493 |
| | | 370/232 |
| 2015/0271865 A1* | 9/2015 | Carson ................. H04L 45/245 |
| | | 370/329 |
| 2016/0099963 A1* | 4/2016 | Mahaffey ............ H04L 63/0227 |
| | | 726/25 |
| 2016/0182581 A1* | 6/2016 | Petria ................. H04L 65/4069 |
| | | 709/231 |
| 2017/0054631 A1* | 2/2017 | Horn ...................... H04L 69/14 |
| 2017/0134261 A1* | 5/2017 | Seo ......................... H04L 12/66 |
| 2017/0208104 A1* | 7/2017 | Wei ......................... H04L 29/06 |
| 2018/0027079 A1* | 1/2018 | Ben Ali .............. G06F 9/45558 |
| | | 709/216 |
| 2018/0041613 A1* | 2/2018 | Lapidous ............ H04L 12/4641 |
| 2018/0041921 A1* | 2/2018 | Kojima ................ H04L 45/245 |
| 2018/0242383 A1* | 8/2018 | Horn ..................... H04W 76/15 |
| 2018/0248714 A1* | 8/2018 | Milescu ............. H04L 12/5601 |

FOREIGN PATENT DOCUMENTS

| | | |
|---|---|---|
| JP | 2015-070616 A | 4/2015 |
| JP | 2015-181276 A | 10/2015 |
| JP | 2015-181277 A | 10/2015 |

\* cited by examiner

MANAGEMENT APPARATUS, COMMUNICATION SYSTEM, AND ALLOCATION METHOD

CROSS-REFERENCE TO RELATED APPLICATION

This application is based upon and claims the benefit of priority of the prior Japanese Patent Application No. 2016-153059, filed on Aug. 3, 2016, the entire contents of which are incorporated herein by reference.

FIELD

The embodiments discussed herein are related to a management apparatus, a communication system, and an allocation method.

BACKGROUND

In recent years, smartphones equipped with, for example, functions for cellular communications such as 3rd Generation (3G)/Long Term Evolution (LTE) and functions for wireless LAN communications such as a wireless local area network (WLAN) or Wi-Fi (registered trademark) have rapidly come into widespread use. Furthermore, known is a link aggregation (LA) technique that accomplishes improvement in throughput (a communication speed) with regard to a certain traffic flow by establishing and using, for example, an LTE line and a WLAN line at the same time.

As a type of LA technique, there is a Multipath TCP (MPTCP) connection in which a transmission control protocol (TCP) connection is established to each of different types of lines and data is allocated, for example, to each TCP connection over the LTE line and the WLAN line to perform communication. The MPTCP connection is standardized by Internet Engineering Task Force (IETF) that is an organization for standardization. A plurality of TCP connections over lines are aggregated in the MPTCP connection, and the MPTCP connection appears to be a single TCP connection for an application. Therefore, an adjustment to the application is unnecessary, and the MPTCP may be applied to any applications that use the TCP. Because many applications use the TCP connection, throughput of the TCP flow is desired to be improved.

However, both the server and the terminal have to support the MPTCP so as to apply the MPTCP to the TCP flow between the server and the terminal. The terminal, if equipped with an MPTCP function, may support the MPTCP. However, it is difficult for all servers on the Internet to be equipped with the MPTCP function. Therefore, an MPTCP proxy server (hereinafter simply referred to as a proxy) for terminating the TCP flow between the server and the terminal and switching from the TCP to MPTCP is desirable. The proxy makes the MPTCP connection available to the communication between the terminal and the server that does not support the MPTCP.

Japanese Laid-open Patent Application Publication Nos. 2014-127790, 2014-110639, 2015-70616, 2015-181276, and 2015-181277 are examples of the related art.

SUMMARY

According to an aspect of the invention, a management apparatus configured to allocate a plurality of terminals to a plurality of proxy servers, the management apparatus includes a memory, a processor coupled to the memory and the processor configured to collect first line information of a first line and second line information of a second line, which are used for a terminal of the plurality of terminals, calculate a speed difference between a first line speed of the first line and a second line speed of the second line, based on line speeds in accordance with the first line information and the second line information, and allocate the terminal to a proxy server of the plurality of proxy servers, based on the speed difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In deploying a plurality of proxies on a network that accommodates many terminals, it is desirable to allocate terminals efficiently to the plurality of proxies, and distribute load among the proxies.

Examples of a technique that enables the load to be distributed among proxy servers are described in detail below with reference to the drawings. The technique disclosed is not limited to Examples. Furthermore, Examples described below may be appropriately combined in a range where the combination does not incur contradiction.

First Embodiment

Figure 1:
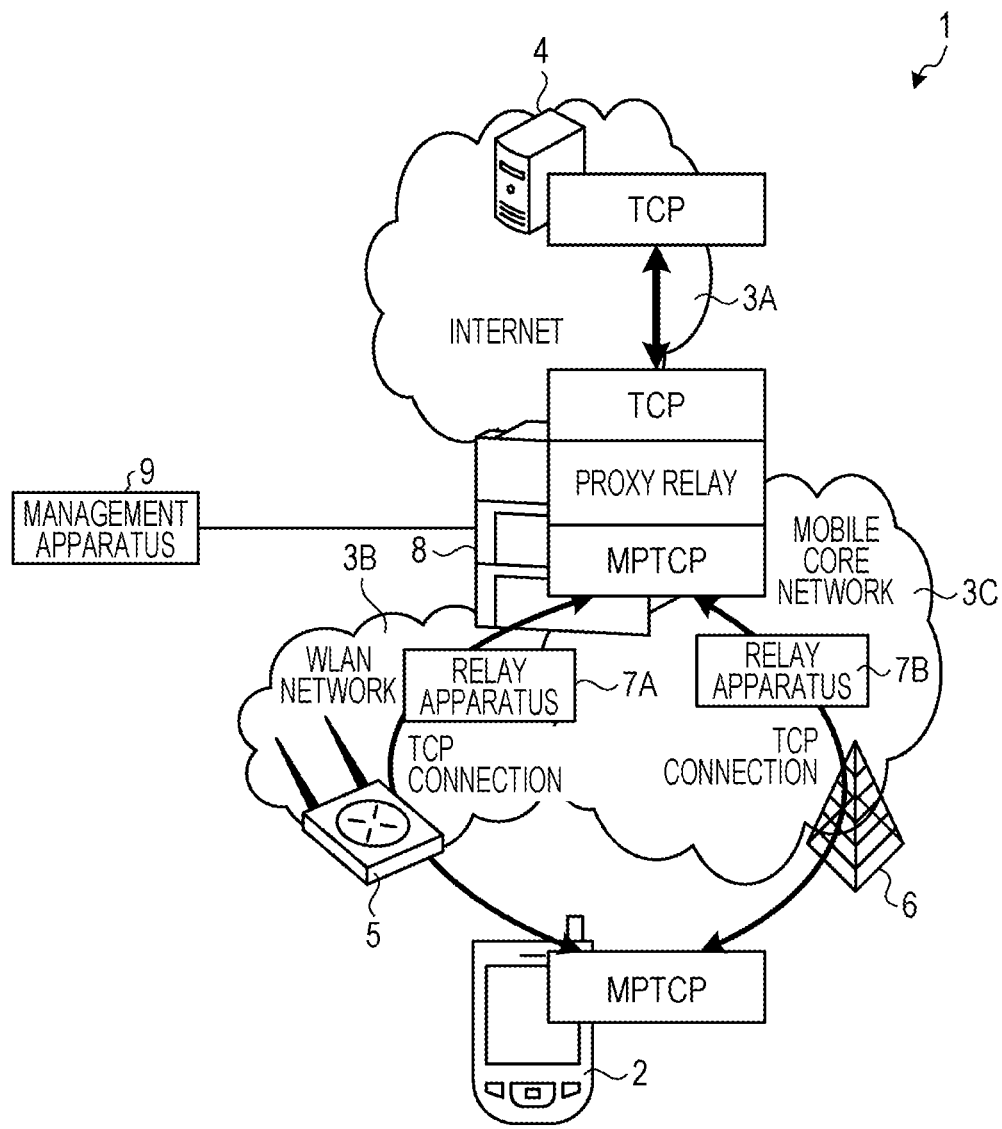
FIG. 1 is a diagram illustrating an exemplary communication system according to First Embodiment.

FIG. 1 is a diagram illustrating an exemplary communication system 1 according to First Embodiment. The communication system 1 illustrated in FIG. 1 has a terminal 2, a server 4 on the Internet 3A, an access point (AP) 5 on a WLAN network 3B, a base station 6 on a mobile core network 3C, a relay apparatus 7, a proxy 8, and a management apparatus 9.

The terminal 2 is, for example, a terminal such as a smartphone that establishes a WLAN line on the WLAN network 3B and an LTE line on the mobile core network 3C at the same time and thus realizes LA in an MPTCP connection. The server 4 is an apparatus provided on the Internet 3A, and for example, transmits data to the terminal 2. The AP 5 is a communication point that establishes the WLAN line on the WLAN network 3B. The base station 6 is a communication point that establishes the LTE line on the mobile core network 3C. The relay apparatus 7 includes a relay apparatus 7A that relays WLAN data between the proxy 8 and the AP 5, and a relay apparatus 7B that relays LTE data between the proxy 8 and the base station 6. The proxy 8 is an apparatus that switches between the TCP connection and the MPTCP connection between the server 4 and the terminal 2. The proxy 8 performs communication in the TCP connection between the proxy 8 itself and the server 4 and performs communication in the MPTCP connection between the proxy 8 itself and the terminal 2. The MPTCP connection is data communication in the LA that uses both of the TCP connection over the LTE line and the TCP connection over the WLAN line.

The management apparatus 9, for example, is provided on the mobile core network 3C or the WLAN network 3B, and manages the entire communication system 1. The management apparatus 9 is an apparatus that efficiently allocates the terminals 2 to each of the proxies 8, in order to distribute load among the proxies 8. The management apparatus 9 collects a modulation and coding scheme (MCS) value of the LTE line and an MCS value of the WLAN line that are used for the MPTCP connection for every terminal 2. The MCS value is line information that results from indexing combinations of a wireless modulation type, a coding rate, and the like. The higher the received quality of every line becomes, the higher bit rate the MCS value becomes, and the greater the MCS value becomes, the higher a line speed becomes.

The management apparatus 9 multiplies an MCS value of the LTE line for every terminal 2 by transmission efficiency of the LTE line, and thus calculates a line speed of the LTE line. The transmission efficiency of the LTE line is assumed to be stipulated in advance. Furthermore, the management apparatus 9 multiplies an MCS value of the WLAN line for every terminal 2 by transmission efficiency of the WLAN line, and thus calculates a line speed of the WLAN line. The transmission efficiency of the WLAN line is assumed to be stipulated in advance. The management apparatus 9 calculates a line speed difference between the line speed of the LTE line and the line speed of the WLAN line, as a load index. As the load index becomes higher, the proxy 8 has to be provided with a more amount of buffer of a transmission buffer for buffering the line speed difference between the WLAN line and the LTE line.

Figure 2:
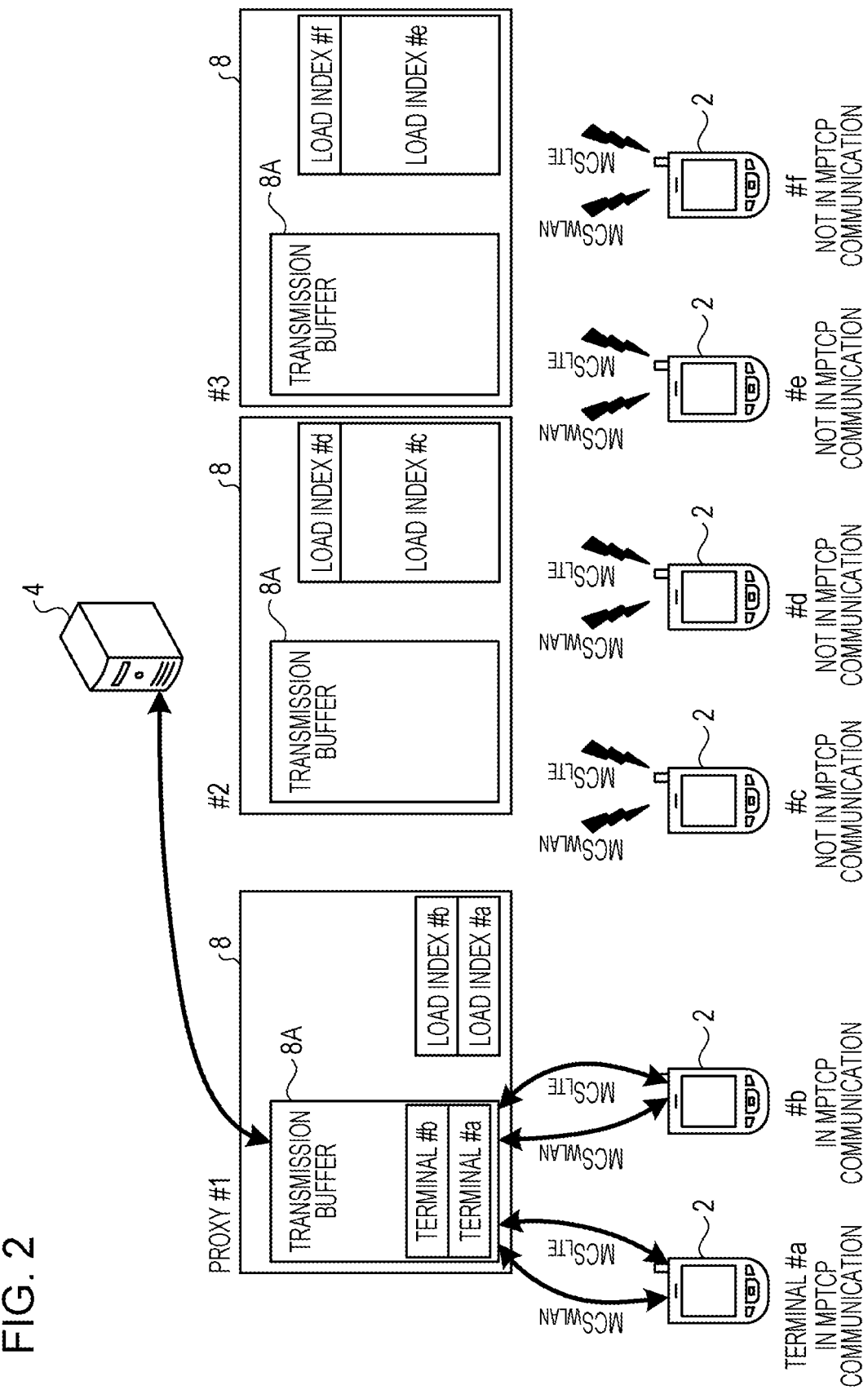
FIG. 2 is a diagram illustrating an exemplary communication system before load distribution.

FIG. 2 is a diagram illustrating an exemplary communication system 1 before load distribution. The communication system 1 illustrated in FIG. 2 has, for example, three proxies 8, that is, proxies #1 to #3, and six terminals 2, that is, terminals # a to # f. The proxy 8 has a relay unit not illustrated, and a transmission buffer 8A. The transmission buffer 8A of each proxy 8 is assumed to have a predetermined amount of buffer.

The terminals 2 # a and # b are allocated to the proxy 8 #1, and a load index of the proxy 8 #1 is a sum of load indexes of terminals 2 # a and # b, which relate to the terminals 2 # a and # b. A load index of terminal 2 # a is a line speed difference between a line speed obtained by multiplying the MCS value of the WLAN line for the terminal 2 # a, by the transmission efficiency of the WLAN line, and a line speed obtained by multiplying the MCS value of the LTE line for the terminal 2 # a, by the transmission efficiency of the LTE line. A load index of terminal 2 # b is a line speed difference between a line speed obtained by multiplying the MCS value of the WLAN line for the terminal 2 # b, by the transmission efficiency of the WLAN line, and a line speed obtained by multiplying the MCS value of the LTE line for the terminal 2 # b, by the transmission efficiency of the LTE line. Because the proxy 8 #1 is in MPTCP communication with the terminals 2 # a and # b, the terminals 2 # a and # b are in a state of being not allocable to proxies 8 other than the proxy 8 #1. Data packets for the terminals 2 # a and # b are stored in the transmission buffer 8A of the proxy 8 #1.

The terminals 2 # c and # d are allocated to the proxy 8 #2, and a load index of the proxy 8 #2 is a sum of load indexes of terminals 2 # c and # d, which relate to the terminals 2 # c and # d. A load index of terminal 2 # c is a line speed difference between a line speed obtained by multiplying the MCS value of the WLAN line for the terminal 2 # c, by the transmission efficiency of the WLAN line, and a line speed obtained by multiplying the MCS value of the LTE line for the terminal 2 # c, by the transmission efficiency of the LTE line. A load index of terminal 2 # d is a line speed difference between a line speed obtained by multiplying the MCS value of the WLAN line for the terminal 2 # d, by the transmission efficiency of the WLAN line, and a line speed obtained by multiplying the MCS value of the LTE line for the terminal 2 # d, by the transmission efficiency of the LTE line. Because the proxy 8 #2, is not in MPTCP communication with the terminals 2 # c and # d, that is, is in non-communication, the terminals 2 # c and # d are in a state of being allocable to other proxies 8. Being in non-communication means that the terminal 2 finishes making a connection on a line between the terminal 2 itself and the proxy 8, although a state where the MPTCP connection is not established is attained.

The terminals 2 # e and # f are allocated to the proxy 8 #3, and a load index of the proxy 8 #3 is a sum of load indexes of terminals 2 # e and # f, which relate to the terminals 2 # e and # f. A load index of terminal 2 # e is a line speed difference between a line speed obtained by multiplying the MCS value of the WLAN line for the terminal 2 # e, by the transmission efficiency of the WLAN line, and a line speed obtained by multiplying the MCS value of the LTE line for the terminal 2 # e, by the transmission efficiency of the LTE line. A load index of terminal 2 # f is a line speed difference between a line speed obtained by multiplying the MCS value of the WLAN line for the terminal 2 # f, by the transmission efficiency of the WLAN line, and a line speed obtained by multiplying the MCS value of the LTE line for the terminal 2 # f, by the transmission efficiency of the LTE line. Because the proxy 8 #3 is in non-communication with the terminals 2 # e and # f, the terminals 2 # e and # f are in a state of being allocable to other proxies 8.

The management apparatus 9 calculates a load index of each of the terminals 2 # a to # f. In order to equalize sums of load indexes of terminals 2 that are being allocated to proxies 8 #1 to #3, based on the calculated load indexes, the management apparatus 9 allocates the terminals 2 that are in non-communication, to the proxies 8.

Figure 3:
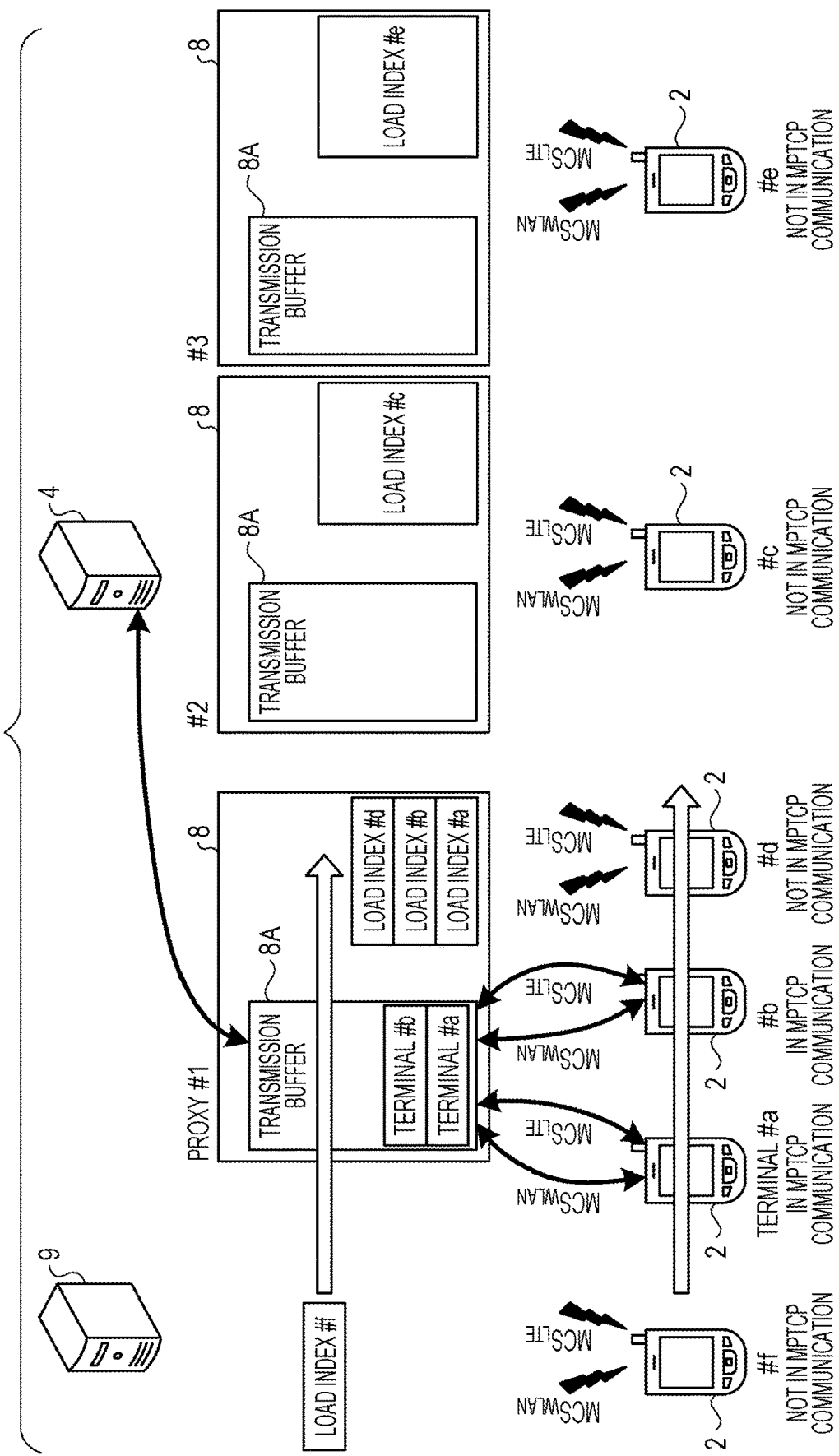
FIG. 3 is a diagram illustrating an exemplary communication system while the load distribution is in progress.

FIG. 3 is a diagram illustrating an exemplary communication system 1 while the load distribution is in progress. The terminals 2 # a and # b are in MPTCP communication, and terminals 2 # c, # d, # e, and # f are in non-communication. Based on the sum of the load indexes of the terminals 2 that are already allocated to every proxy 8, the management apparatus 9 allocates the terminals 2 # d and # f that are in non-communication, to the proxy 8 #1 in order to equalize the sums of the load indexes of the terminals 2 that are being allocated to the proxy 8.

Figure 4:
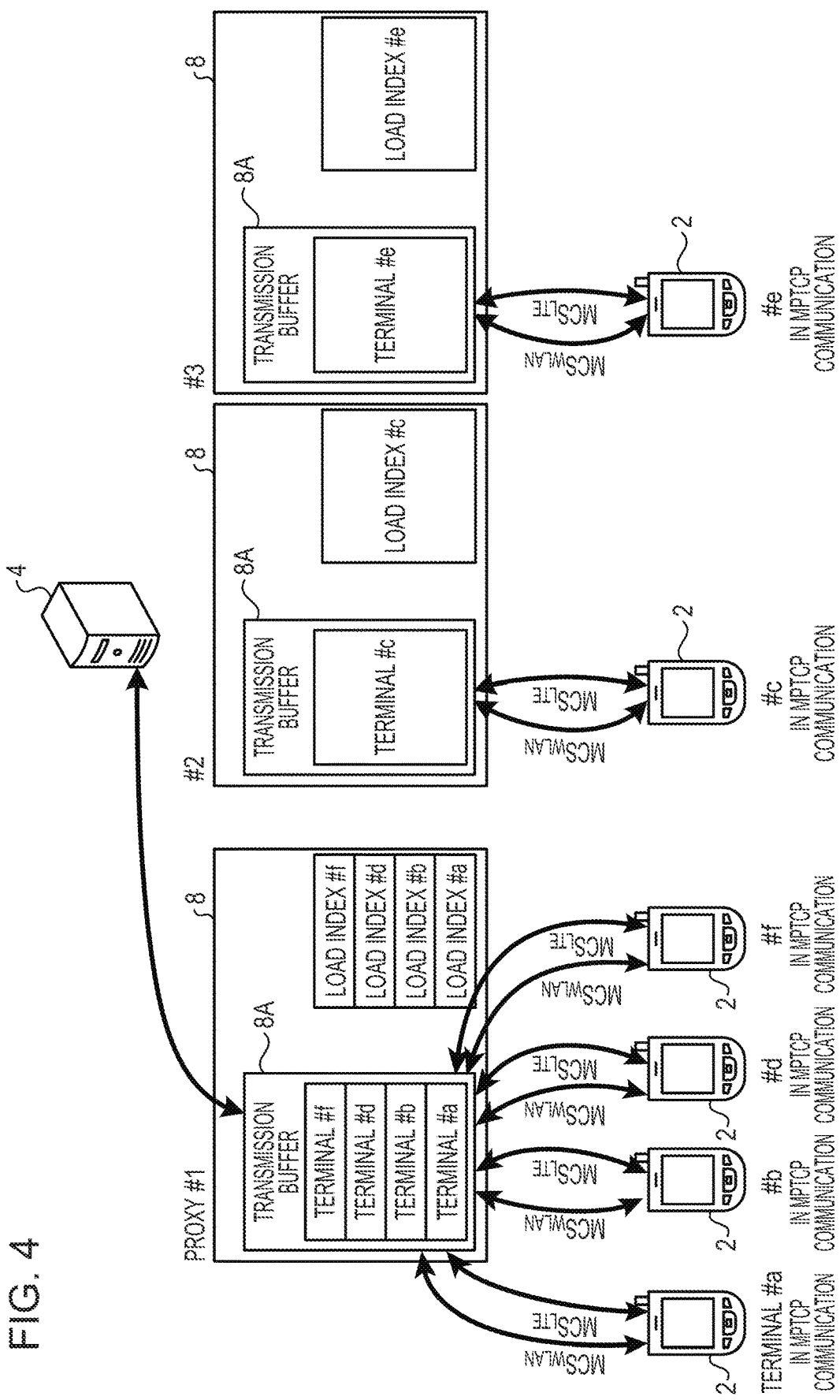
FIG. 4 is a diagram illustrating an exemplary communication system after the load distribution.

FIG. 4 is a diagram illustrating an exemplary communication system 1 after the load distribution. The management apparatus 9, as illustrated in FIG. 4, allocates the terminals 2 # a, # b, # d, and # f to the proxy 8 #1, the terminal 2 # c to the proxy 8 #2, and the terminal 2 # e to the proxy 8 #3. The sum of load indexes of the terminals 2 # a, # b, # d, and # f, a load index of the terminal 2 # c, and a load index of the terminal 2 # e are almost the same in amount. As a result, the sums of the load indexes of the terminals 2 that are being allocated to every proxy 8 #1 to proxy #3 are almost equalized. Data packets for the terminals 2 # a, # b, # d, and # f are stored in the transmission buffer 8A of the proxy 8 #1. A data packet for the terminal 2 # c is stored in the transmission buffer 8A of the proxy 8 #2. A data packet for the terminal 2 # e is stored in the transmission buffer 8A of the proxy 8 #3.

Figure 5:
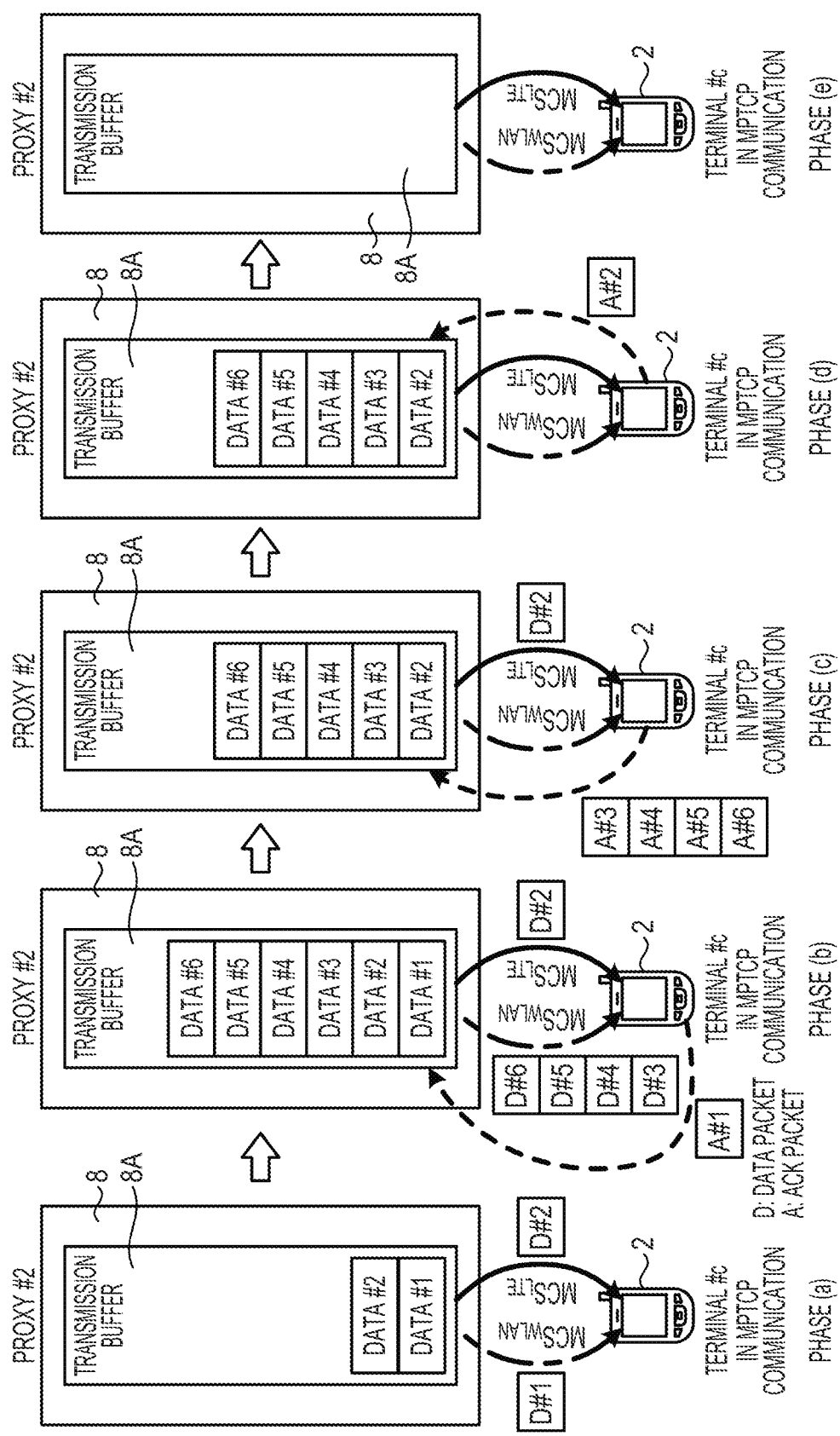
FIG. 5 is a diagram illustrating an example of relevance between a line speed difference and an amount of buffer of a transmission buffer.

At this point, a mechanism in which as the load index of every terminal 2, that is, the line speed difference becomes greater, a more amount of buffer of the transmission buffer 8A within the proxy 8 has to be provided is described. FIG. 5 is a diagram illustrating an example of relevance between the line speed difference and an amount of buffer of the transmission buffer 8A. FIG. 5 illustrates a relationship between the transmission buffer 8A within the proxy 8 #2, and the terminal 2 # c, in MPTCP communication, which has been allocated to the proxy 8 #2. Transitioning from a phase (a) to a phase (e) occurs in a time series.

In the phase (a), the proxy 8 #2 transmits the data packet D#1 to the terminal 2 # c over the WLAN line, and transmits the data packet D#2 to the terminal 2 # c over the LTE line. The proxy 8 #2 retains a data packet in the transmission buffer 8A, until an acknowledgement (ACK) packet corresponding to the data packet is received from the terminal 2 # c.

In the phase (b), after receiving the ACK packet A#1, which corresponds to the data packet D#1 from the terminal 2 # c, the proxy 8 #2 transmits the data packets D#3 to D#6 to the terminal 2 # c over the WLAN line. Because the line speed of the LTE line is lower than the line speed of the WLAN line, the data packet D#2 is assumed not to reach the terminal 2 # c.

In the phase (c), the proxy 8 #2 receives the ACK packets A#3 to A#6, which correspond to the data packets D#3 to D#6, respectively, from the terminal 2 # c. Furthermore, because the ACK packet A#1, which corresponds to the data packet D#1, is received, the proxy 8 #2 deletes the data packet D#1 from the transmission buffer 8A. However, because the line speed of the LTE line is lower than the line speed of the WLAN line, a state where the data packet D#2 does not reach the terminal 2 # c, is assumed. In a specification for MPTCP, for example, the order in which the data packets are transmitted is assumed as follows: D#1, D#2, D#3, D#4, D#5, and D#6. In this case, for example, although the ACK packets that correspond to the data packets D#1 and D#3 to D#6 are received, unless the ACK packet that corresponds to the data packet D#2 is received, the data packets D#3 to D#6 are not deleted from the transmission buffer 8A. Therefore, the greater the line speed difference, the greater the number of out-of-order packets between the lines and the greater the number of data packets that wait for the ACK packets, which stay in the transmission buffer 8A.

In the phase (d), the proxy 8 #2 receives the ACK packet A#2, which corresponds to the data packet D#2, from the terminal 2 # c. As a result, in the phase (e), the proxy 8 #2 may delete the data packets D#2 to D#6 from the transmission buffer 8A. More precisely, the greater the line speed difference in the MPTCP connection, the more out-of-order packets occurs between the lines, and the greater the number of data packets that wait for the ACKs in the transmission buffer 8A. Because of this, it is desirable to secure the transmission buffer 8A.

Figure 6:
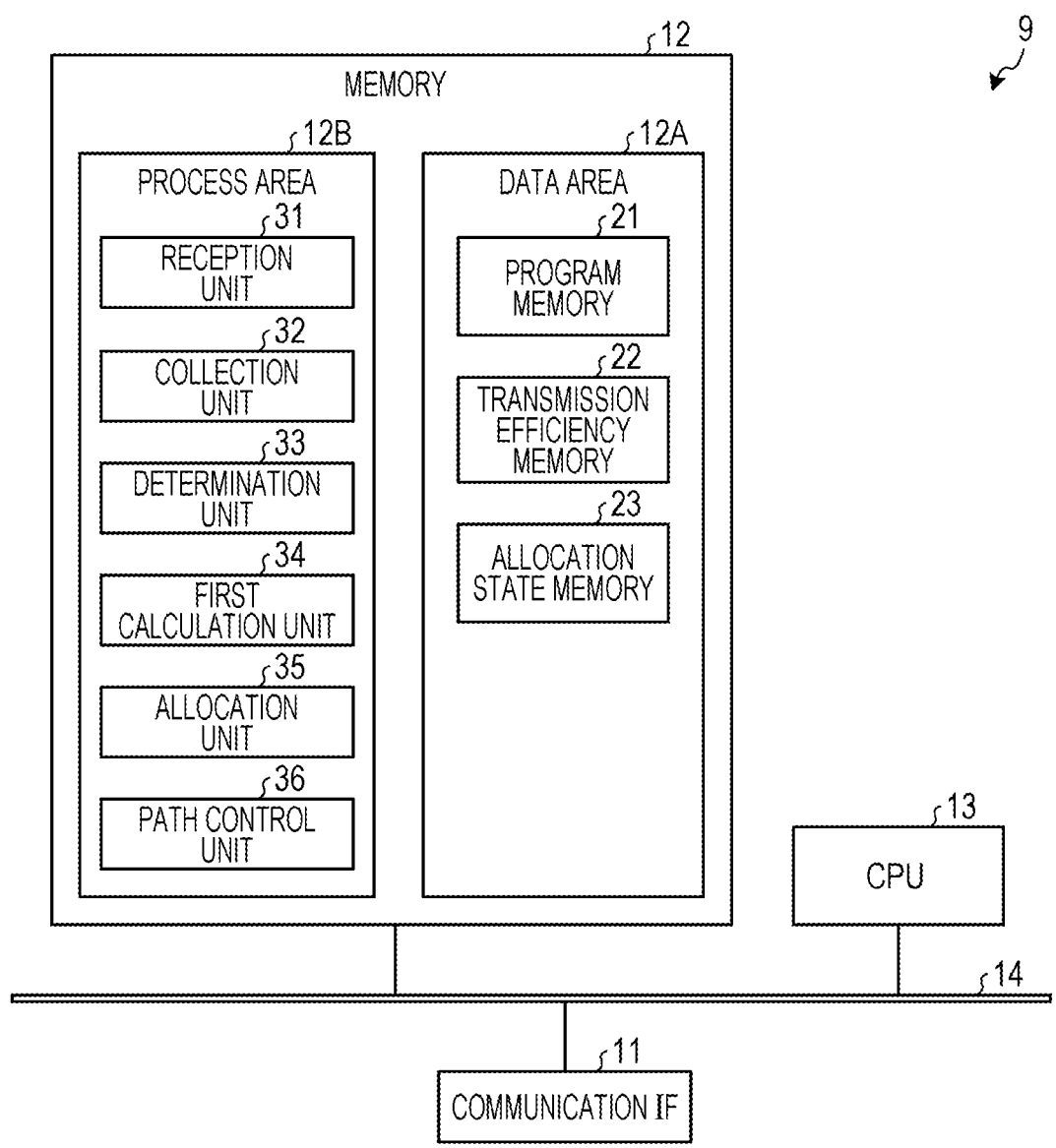
FIG. 6 is a block diagram illustrating an exemplary internal configuration of a management apparatus according to First Embodiment.

FIG. 6 is a block diagram illustrating an exemplary internal configuration of the management apparatus 9 according to First Embodiment. The management apparatus 9 illustrated in FIG. 6 has a communication IF 11, a memory 12, a central processing unit (CPU) 13, and a bus 14. The communication IF 11 is an IF that manages communication between each of the AP 5, the base station 6, the relay apparatus 7, and the proxy 8, through the WLAN network 3B or the mobile core network 3C. The memory 12 is an area in which various programs and various data are stored. The CPU 13 controls the entire management apparatus 9.

The memory 12 has a data area 12A and a process area 12B. The data area 12A has a program memory 21, a transmission efficiency memory 22, and an allocation state memory 23. The program memory 21 is an area in which various programs are stored. The transmission efficiency memory 22 is an area in which transmission efficiency of every line is stored. The transmission efficiency is not an element that depends on each terminal 2, but depends on a specification for a line. Because of this, the transmission efficiency is assumed to be stored in advance in the transmission efficiency memory 22. The allocation state memory 23 is an area for managing a situation of the allocation of the terminal 2 to every proxy 8.

The process area 12B is an area for loading a program stored in the program memory 21, as a program for processing functions, which is executed in the CPU 13. The process area 12B has a reception unit 31, a collection unit 32, a determination unit 33, a first calculation unit 34, an allocation unit 35, and a path control unit 36, as processing functions.

The reception unit 31 receives a line connection notification or a load index change notification from the terminal 2, the base station 6, or the AP 5 through the communication IF 11. The reception unit 31, for example, is capable of receiving the line connection notification or the load index change notification from the terminal 2, the base station 6, or the AP 5. However, it may be set in advance from which one of the terminal 2, the base station 6 and the AP 5 the line connection notification or the load index change notification is received. The line connection notification is notification information that may be obtained from the terminal 2, the base station 6, or the AP 5 in a case where the terminal 2 is in making a connection to the WLAN line or the LTE line. The load index change notification is notification information in a case where the load index changes as the load index of the terminal 2 that has been allocated to the proxy 8 changes, for example, as the received quality of a radio wave of the terminal 2, which has already made a connection, changes.

The collection unit 32 collects an MCS value of each line used for the MPTCP connection from the terminal 2, the base station 6, and the AP 5. Although the terminal 2 is in MPTCP communication between the terminal 2 itself and the proxy 8, or is in non-communication, when the terminal 2 is in a state of being in connection to a line, the collection unit 32 collects the MCS value. More precisely, the collection unit 32 may collect the MCS value of the WLAN line and the MCS value of the LTE line for every terminal 2. Being in non-communication is a state other than being in MPTCP communication.

The determination unit 33 determines a communication situation of the terminal 2 in making a connection to a line or whose load index changes, within the terminal 2 being allocated to every proxy 8. The communication situation is whether the terminal 2 is in MPTCP communication or is in non-communication. Immediately after the terminal 2 makes a connection to a line, the terminal 2 is rarely in MPTCP communication, and in a case where the terminal 2 is allocated with a default setting to a certain proxy 8 before being allocated to the proxy 8 considering a load index, the terminal 2 starts the MPTCP communication after the time has passed just a little since it makes a connection to a line. Accordingly, in the case of a specification in which allocation of a certain proxy 8 is made by default, the determination unit 33 inquires of the proxy 8 whether or not the terminal 2 is in MPTCP communication. In a case where a proxy 8 set by default is present, the determination unit 33 makes such an inquiry to the proxy 8 set by default as the inquire-target proxy 8. In a case where a proxy 8 set by default is not present, the determination unit 33 makes such an inquiry to all proxies 8 as the inquire-target proxy 8. Furthermore, in a case where the load index change notification due to occurrence of a change in the load index of the terminal 2 is received, the determination unit 33 inquires of the proxy 8 whether or not the terminal 2 is in MPTCP communication. The determination unit 33 acquires the proxy 8 inquired of from the allocation state memory 23.

Based on the MCS value and the transmission efficiency of each line for every terminal 2, the first calculation unit 34 calculates the line speed difference as the load index of every terminal 2. The first calculation unit 34 calculates the line speed of the WLAN line, which is obtained by multiplying the MCS value of the WLAN line and the transmission efficiency of the WLAN line for every terminal 2. The first calculation unit 34 calculates the line speed of the LTE line, which is obtained by multiplying the MCS value of the LTE line and the transmission efficiency of the LTE line for every terminal 2. The first calculation unit 34 calculates the line speed difference between the line speed of the WLAN line and the line speed of the LTE line for every terminal 2, as the load index of the terminal 2. Then, the first calculation unit 34, as expressed in Expression (1), calculates the sum of the load indexes of the terminals 2 that are being allocated to every proxy 8. The sum of the load indexes of every proxy 8 is assumed not to include a load index of an allocation-target terminal 2 that is a terminal 2 in making a connection to a line or that is a terminal 2 whose load index changes.

$$ProxyLoad\#n = \sum_{i \in I_{\#n}} |(MCS^i_{LTE} \times TCPeff_{LTE}) - (MCS^i_{WLAN} \times TCPeff_{WLAN})|$$

$MCS^i_{LTEorWLAN}$: MCS value of LTE or WLAN for terminal i $TCPeff_{LTEorWLAN}$: TCP transmission efficiency of LTE or WLAN $I_{\#n}$: set of terminals that are allocated to proxy # n . . . (1)

Based on the load index of every terminal 2, a usage situation of every terminal 2, and the situation of the allocation to the proxy 8, the allocation unit 35 notifies each proxy 8 of an instruction that allocates the allocation-target terminal 2 which is in non-communication such that the loads among the proxies 8 are equalized. The usage situation of every terminal 2 is a state of being in MPTCP communication or a state of being in non-communication. The situation of the allocation to the proxy 8 is a situation of the allocation of the terminal 2 allocated to each proxy 8. The allocation unit 35 allocates an allocation-target terminal 2 to the proxy 8, and then stores the situation of the allocation of the terminal 2 to every proxy 8, in the allocation state memory 23.

Based on the allocation situation of the terminal 2 to every proxy 8, the path control unit 36 sets an optimal path for every terminal 2 for the relay apparatus 7. The path control unit 36 sets a path using a routing table for the relay apparatus 7 on the mobile core network 3C and the WLAN network 3B or by performing a table operation of the relay apparatus 7 using Open Flow (registered trademark).

Figure 7:
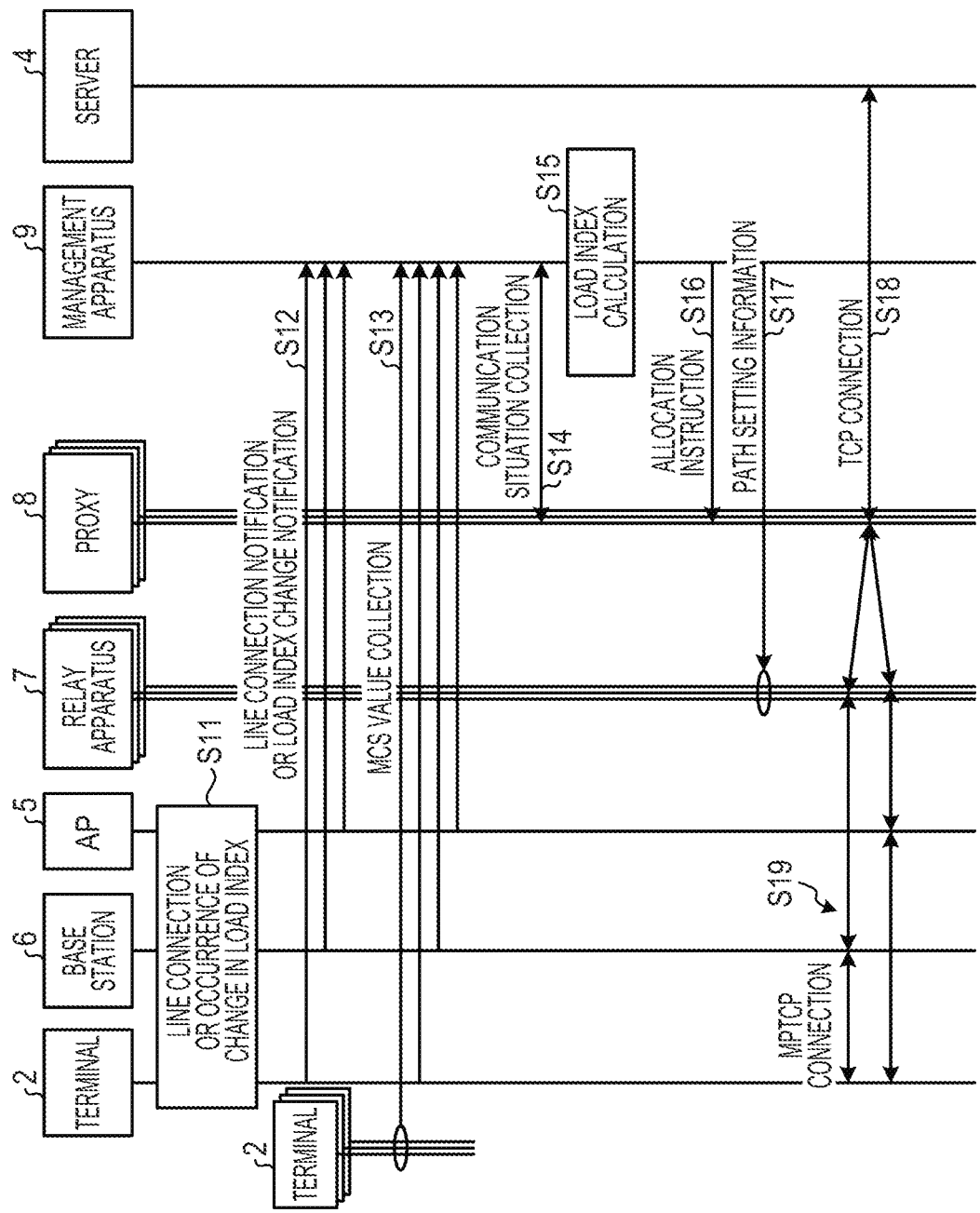
FIG. 7 is a sequence diagram illustrating an example of processing operation of a communication system that relates to first load distribution processing.

Next, operation of the communication system 1 according to the First Embodiment is described. FIG. 7 is a sequence diagram illustrating an example of processing operation of the communication system 1 that relates to first load distribution processing.

In a case where a line connection or occurrence of a load index change is detected (Operation S11), the terminal 2, the base station 6, or the AP 5 illustrated in FIG. 7 notifies the management apparatus 9 of the line connection notification or the load index change notification (Operation S12). In a case where the line connection notification or the load index change notification is received, the management apparatus 9 collects the MCS value of each line, which is used for the MPTCP connection, from the terminal 2, the base station 6, or the AP 5 (Operation S13).

The management apparatus 9 collects a communication situation of every terminal 2 being allocated, for example, a state of being in MPTCP communication, or a state of being in non-communication, from each proxy 8 (Operation S14). Based on the MCS value of each line and the transmission efficiency of each line for every terminal 2, the management apparatus 9 calculates the load index of every terminal 2 (Operation S15).

Based on the load index of every terminal 2, the usage situation of every terminal 2, and the situation of the allocation of the terminal 2 to every proxy 8, the management apparatus 9 notifies each proxy 8 of the instruction that allocates the allocation-target terminal 2, in order to equalize the sums of the load indexes of every proxy 8 (Operation S16). As a result, based on the allocation instruction, the proxy 8 allocates the allocation-target terminal 2 in non-communication, to the proxy 8. The management apparatus 9 notifies the relay apparatus 7 of path setting information indicating a path setting for every terminal 2 being allocated to each proxy 8 (Operation S17). As a result, based on the path setting information, each relay apparatus 7 sets optimal paths on the WLAN line and the LTE line, which are used for the MPTCP connection between the proxy 8 and the terminal 2.

The proxy 8 establishes the TCP connection between the proxy 8 itself and the server 4 (Operation S18). The proxy 8 establishes the TCP connection over the LTE line between the proxy 8 itself and the terminal 2 through the relay apparatus 7 and the base station 6, and establishes the TCP connection over the WLAN line between the proxy 8 itself and the terminal 2 through the relay apparatus 7 and the AP 5. As a result, the proxy 8 establishes the MPTCP connection over the WLAN line and the LTE line between the proxy 8 itself and the terminal 2 (Operation S19).

Figure 8:
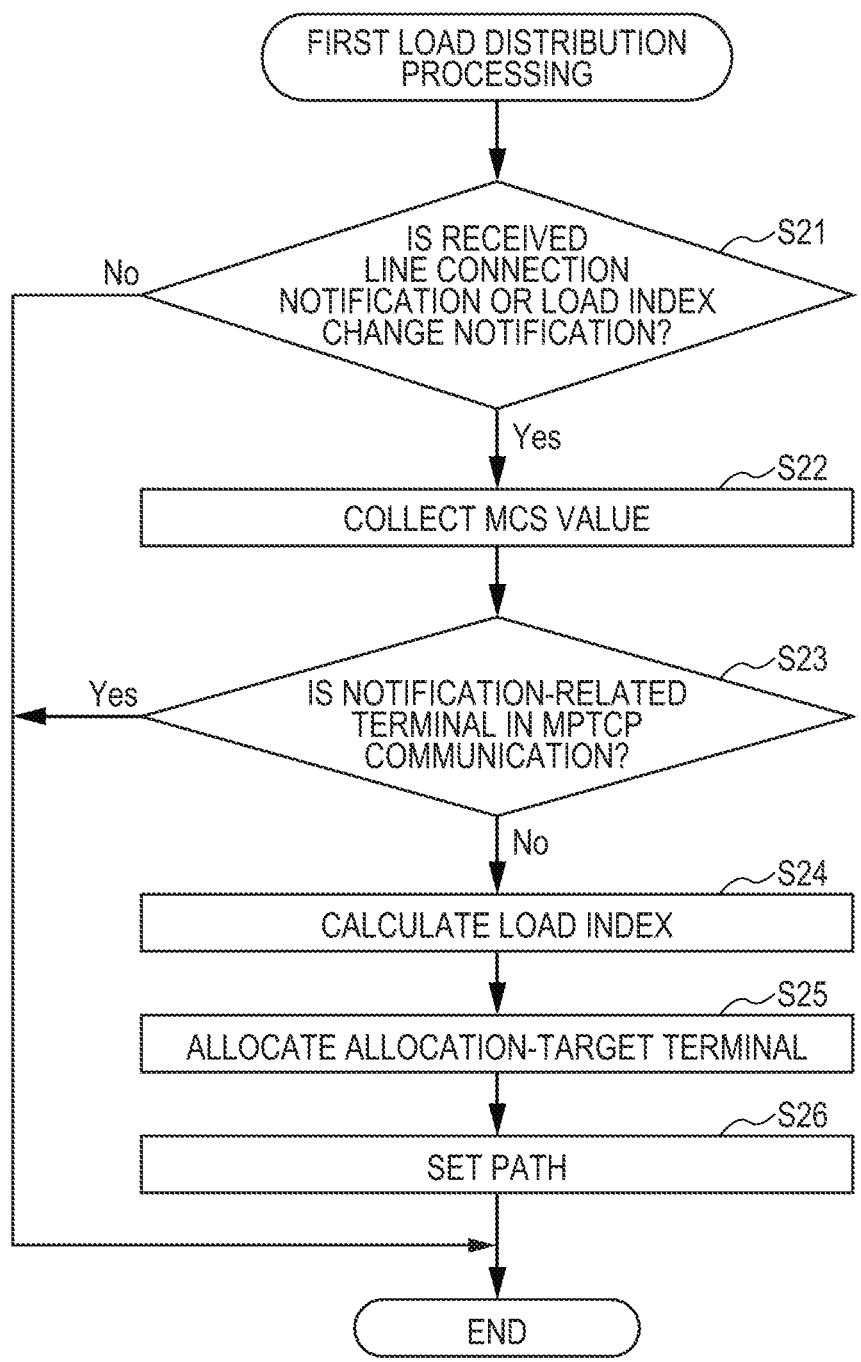
FIG. 8 is a flowchart illustrating an example of processing operation of the management apparatus that relates to the first load distribution processing.

FIG. 8 is a flowchart illustrating an example of processing operation of the management apparatus 9 that relates to the first load distribution processing. The reception unit 31 within the management apparatus 9 illustrated in FIG. 6 determines whether or not the line connection notification or the load index change notification is received (Operation S21). In the case where the line connection notification or the load index change notification is received (Yes in Operation S21), the collection unit 32 within the management apparatus 9 collects the MCS value of each line, which is used for the MPTCP connection for every terminal 2 within the communication system 1 (Operation S22).

The determination unit 33 within the management apparatus 9 determines whether or not a notification-related terminal 2 is in MPTCP communication (Operation S23). In a case where the notification-related terminal 2 is not in MPTCP communication (No in Operation S23), the first calculation unit 34 within the management apparatus 9 calculates the load index based on the MCS value of each line used for the MPTCP connection for every terminal 2 (Operation S24). The load index is a line speed difference of each line used for the MPTCP connection.

Based on the load index of every terminal 2, the usage situation of every terminal 2, and the situation of the allocation of the terminal 2 to every proxy 8, the allocation unit 35 within the management apparatus 9 allocates the allocation-target terminal 2 to the proxy 8 such that the sums of the load indexes of the terminals 2 that have been allocated to every proxy 8 are equalized (Operation S25). The allocation-target terminal 2 is a terminal 2 that is in non-communication.

Based on the instruction that allocates the terminal 2, the path control unit 36 within the management apparatus 9 sets an optimal path that corresponds to the situation of the allocation of every terminal 2 to the proxy 8, for the relay apparatus 7 (Operation S26), and ends a processing operation illustrated in FIG. 8. In a case where the line connection notification or the load index change notification is not received (No in Operation S21), the reception unit 31 ends the processing operation illustrated in FIG. 8. In a case where the notification-related terminal 2 is in MPTCP communication (Yes in Operation S23), the determination unit 33 ends the processing operation illustrated in FIG. 8.

The management apparatus 9 calculates the line speed difference between the line speed obtained by multiplying the MCS value of the WLAN line for every terminal 2 by the transmission efficiency of the WLAN line, and the line speed obtained by multiplying the MCS value of the LTE line for every terminal 2 by the transmission efficiency of the LTE line, as the load index of every terminal 2. The management apparatus 9 allocates the allocation-target terminal 2 in non-communication, to each proxy 8 such that the sums of the load indexes of the terminals 2 that are allocated to every proxy 8 are equalized among the proxies 8. As a result, in order to equalize amounts of used buffer of the transmission buffers 8A, the management apparatus 9 distributes the load on the proxy 8 and thus may increase the number of terminals that are accommodated in the proxy 8.

The collection unit 32 according to the First Embodiment described above collects an MCS value of every line for all terminals 2 within the communication system 1, but the collection unit 32 may store the MCS value of every line for each terminal 2 in the allocation state memory 23. In this case, it is assumed that the collection unit 32, for example, collects only the MCS value for the terminal 2 in making a connection to a line, or the terminal 2 whose load index changes, and acquires the MCS value for another terminal 2 from the allocation state memory 23.

The first calculation unit 34 calculates the line speed difference between the line speed obtained by multiplying the MCS value of the WLAN line by the transmission efficiency of the WLAN line, and the line speed obtained by multiplying the MCS value of the LTE line by the transmission efficiency of the LTE line, as the load index of every terminal 2. However, the first calculation unit 34 may calculate a line speed difference between a line speed stipulated for the MCS value of the WLAN line, and a line speed stipulated for the MCS value of the LTE line, as the load index, without taking into consideration the transmission efficiency. In this case, although the precision of the line speed difference decreases, the first calculation unit 34 may calculate the line speed difference at high speed.

Furthermore, the first calculation unit 34 may consider an amount of residual buffer (an amount of available space) of the transmission buffer 8A within the proxy 8 when the allocation-target terminal 2 in non-communication, is allocated to the proxy 8 based on the line speed difference for every terminal 2. An implementation in such a case is described below as Second Embodiment.

Second Embodiment

Figure 9:
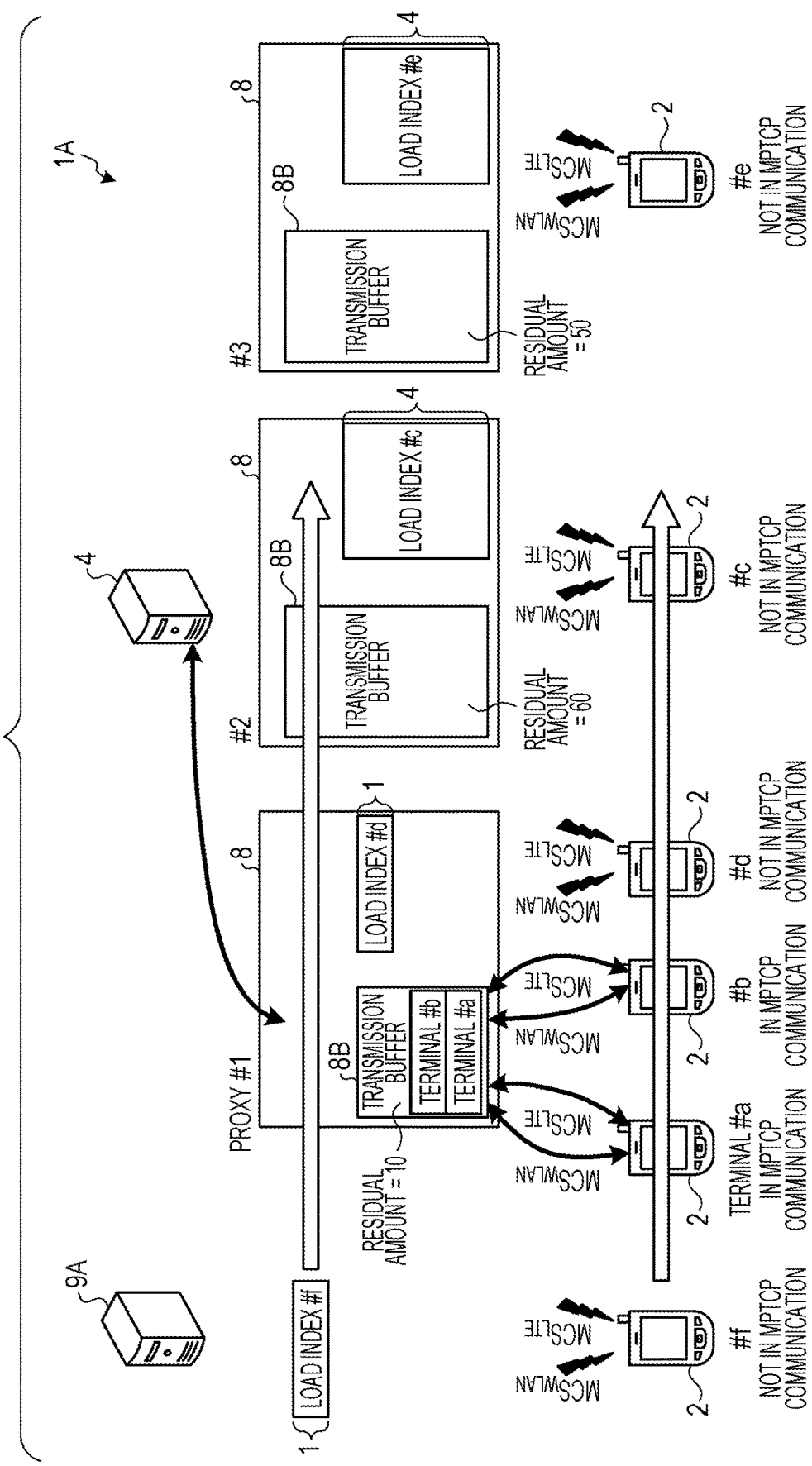
FIG. 9 is a diagram illustrating an exemplary communication system while the load distribution is in progress according to Second Embodiment.

FIG. 9 is a diagram illustrating an exemplary communication system 1A while the load distribution is in progress, according to Second Embodiment. A configuration that is the same as that of the communication system 1 according to the First Embodiment is given the same reference numeral, and descriptions of overlapping configurations and operations are omitted.

A management apparatus 9A illustrated in FIG. 9 and the management apparatus 9 according to the First Embodiment are different from each other in that, in order to equalize the sums of the load indexes among the proxies 8 while taking into consideration the amount of residual buffer of the transmission buffer 8B within the proxy 8, the allocation-target terminal 2 in non-communication is allocated to each proxy 8. The management apparatus 9A allocates the allocation-target terminal 2 in non-communication, to each proxy 8 such that a weighting is applied to the sum of the load indexes of each proxy 8 according to the amount of residual buffer of the transmission buffer 8B and the applied sums of the load indexes are equalized among the proxies 8.

Figure 10:
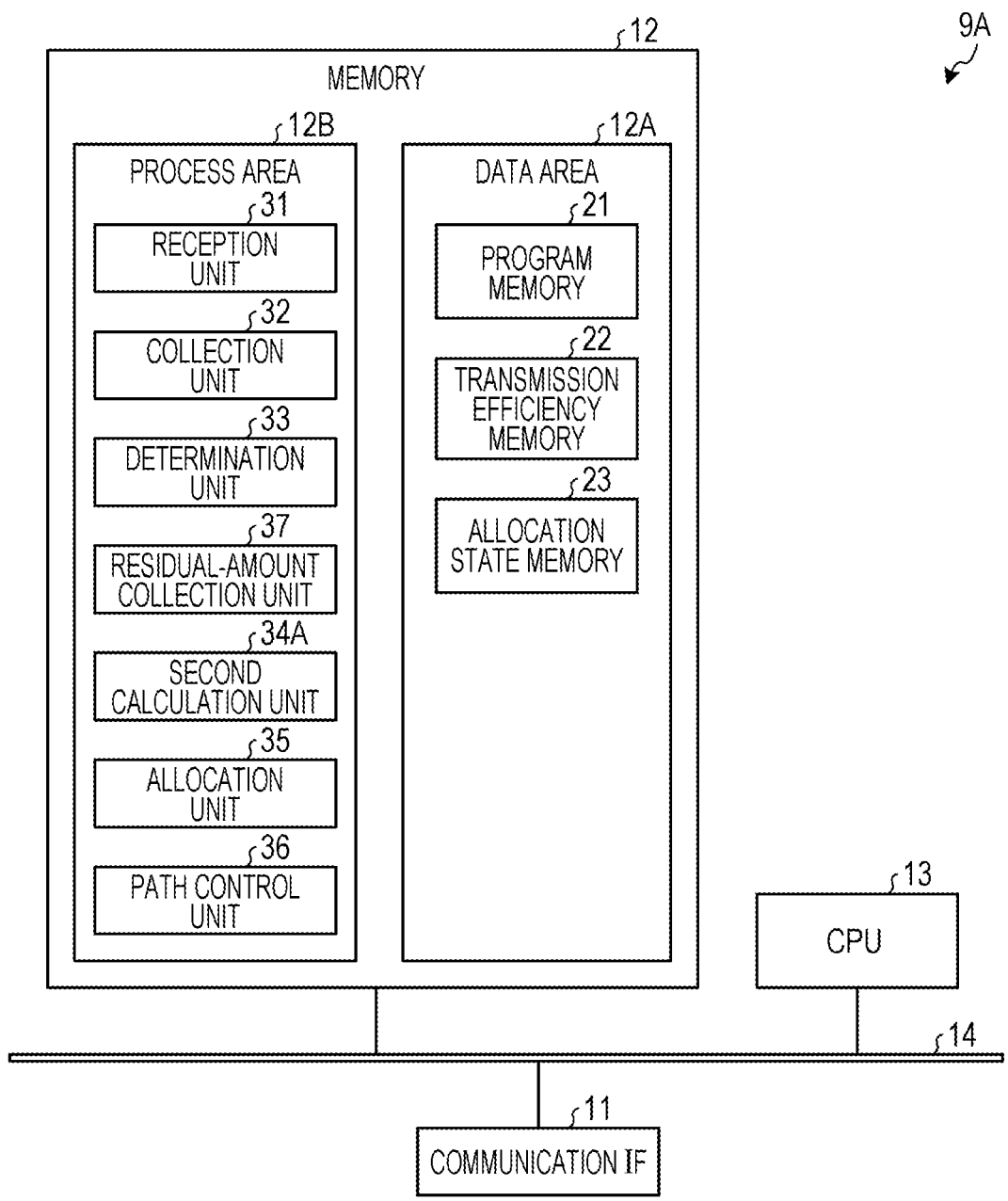
FIG. 10 is a block diagram illustrating an exemplary internal configuration of a management apparatus according to Second Embodiment.

FIG. 10 is a block diagram illustrating an exemplary internal configuration of the management apparatus 9A according to Second Embodiment. The management apparatus 9A illustrated in FIG. 10 has the communication IF 11, the memory 12, the CPU 13, and the bus 14. The process area 12B within the memory 12 has a residual-amount collection unit 37 and a second calculation unit 34A, in addition to the reception unit 31, the collection unit 32, the determination unit 33, the allocation unit 35, and the path control unit 36.

The determination unit 33 inquires of all terminals 2 that are allocated to the proxy 8 whether or not they are in MPTCP communication. In a case where the sum of the load indexes of the terminals 2 that have been allocated to every proxy 8 is calculated, because the load index of the terminal 2 in MPTCP communication is excluded, it is desirable to inquire of all terminals 2 whether or not they are in MPTCP communication.

The residual-amount collection unit 37 collects the amount of residual buffer of the transmission buffer 8B of every proxy 8. The amount of residual buffer of the transmission buffer 8B is an amount that results from subtracting an amount of used buffer from a capacity of the transmission buffer 8B. It is assumed that the amount of residual buffer of the transmission buffer 8B within one proxy 8 #1, for example, is 10 M bytes, the amount of residual buffer of the transmission buffer 8B within the proxy 8 #2, for example, is 60 M bytes, and the amount of residual buffer of the transmission buffer 8B within the proxy 8 #3, for example, is 50 M bytes.

The second calculation unit 34A calculates the line speed of the WLAN line obtained by multiplying the MCS value of the WLAN line for every terminal 2 by the transmission efficiency of the WLAN line, and the line speed of the LTE line obtained by multiplying the MCS value of the LTE line by the transmission efficiency of the LTE line. The second calculation unit 34A calculates the line speed difference between the line speed of the WLAN line and the line speed of the LTE line for every terminal 2, as the load index of the terminal 2. The second calculation unit 34A calculates the load index of the terminal 2 in non-communication. It is assumed that the terminal 2 in non-communication, as illustrated in FIG. 9, is equivalent to the terminals 2 # c, # d, # e, and # f, the load index of the terminal 2 # c is 4, the load index of the terminal 2 # d is 1, the load index of the terminal 2 # e is 4, and the load index of the terminal 2 # f is 1. Based on the load index of each terminal 2, the second calculation unit 34A, as expressed in Expression (2), calculates the sum of the load indexes of each proxy 8, to which a weighting is applied according to the amount of residual buffer of the transmission buffer 8B within each proxy 8.

$$ProxyLoad\#n = \frac{1}{Rem_{\#n}} \sum_{i \in I_{\#n}} |(MCS^i_{LTE} \times TCPeff_{WLAN}) - (MCS^i_{LTE} \times TCPeff_{WLAN})|$$

$MCS^i_{LTEorWAN}$: MCS value of LTE or WLAN for terminal i $TCPeff^i_{LTEorWAN}$: TCP transmission efficiency of LTE or WLAN $I_{\# n}$: set of terminals that are allocated to proxy # n $Rem_{\# n}$: residual amount in transmission buffer to proxy # n . . . (2)

Based on the load index of the terminal 2 that has been allocated to every proxy 8, the second calculation unit 34A calculates the sum of the load indexes of each proxy 8. The sum of the load indexes of the proxy 8 is assumed not to include the load index of the terminal 2 in MPTCP communication. The second calculation unit 34A divides the sum of the load indexes of each proxy 8 by the amount of residual buffer in the proxy 8 that is an allocation destination.

The second calculation unit 34A calculates a sum of load indexes of allocation patterns in each of which the allocation-target terminal 2 is allocated to each proxy 8 and adopts an allocation pattern in which a standard deviation of the sum of the load indexes of each proxy 8 is minimized. The second calculation unit 34A calculates the sum of the load indexes of the allocation patterns in a case where the terminal 2 # f is allocated to the proxy 8 #1, the proxy 8 #2, or the proxy 8 #3, for every proxy 8, and adopts the allocation pattern in which the standard deviation of the sum of the load indexes of each proxy 8 is minimized.

For example, in a case where the terminal 2 # f is allocated to the proxy 8 #1, the sum of the load indexes of the proxy 8 #1 is ProxyLoad#1=(1+1)/10=0.20, the sum of the load indexes of the proxy 8 #2 is ProxyLoad#2=4/60≅0.067, and the sum of the load indexes of the proxy 8 #3 is ProxyLoad#3=4/50=0.080. As a result, in a case where the allocation-target terminal 2 is allocated to the proxy 8 #1, the standard deviation of the sum ProxyLoad#1,#2,#3 of the load indexes of each proxy 8≅0.0600.

Furthermore, in a case where the terminal 2 # f is allocated to the proxy 8 #2, the sum of the load indexes of the proxy 8 #1 is ProxyLoad#1=1/10=0.10, the sum of the load indexes of the proxy 8 #2 is ProxyLoad#2=(4+1)/60≅0.083, and the sum of the load indexes of the proxy 8 #3 is ProxyLoad#3=4/50=0.080. As a result, in a case where the allocation-target terminal 2 is allocated to the proxy 8 #2, the standard deviation of the sum ProxyLoad#1,#2,#3 of the load indexes of each proxy 8≅0.0087.

Furthermore, in a case where the terminal 2 # f is allocated to the proxy 8 #3, the sum of the load indexes of the proxy 8 #1 is ProxyLoad#1=1/10=0.10, the sum of the load indexes of the proxy 8 #2 is ProxyLoad#2=4/60=0.083, and the sum of the load indexes of the proxy 8 #3 is ProxyLoad#3=(4+1)/50=0.10. As a result, in a case where the allocation-target terminal 2 is allocated to the proxy 8 #3, the standard deviation of the sum ProxyLoad#1,#2,#3 of the load indexes of each proxy 8≅0.0157.

Then, the second calculation unit 34A adopts an allocation pattern that is an allocation pattern in which the standard deviation of the allocation pattern in a case where the terminal 2 # f is allocated to the proxy 8 #2 is minimized.

Therefore, the allocation unit 35 notifies the proxy 8 of the instruction that allocates the allocation-target terminal 2 # f to the proxy 8 #2.

Figure 11:
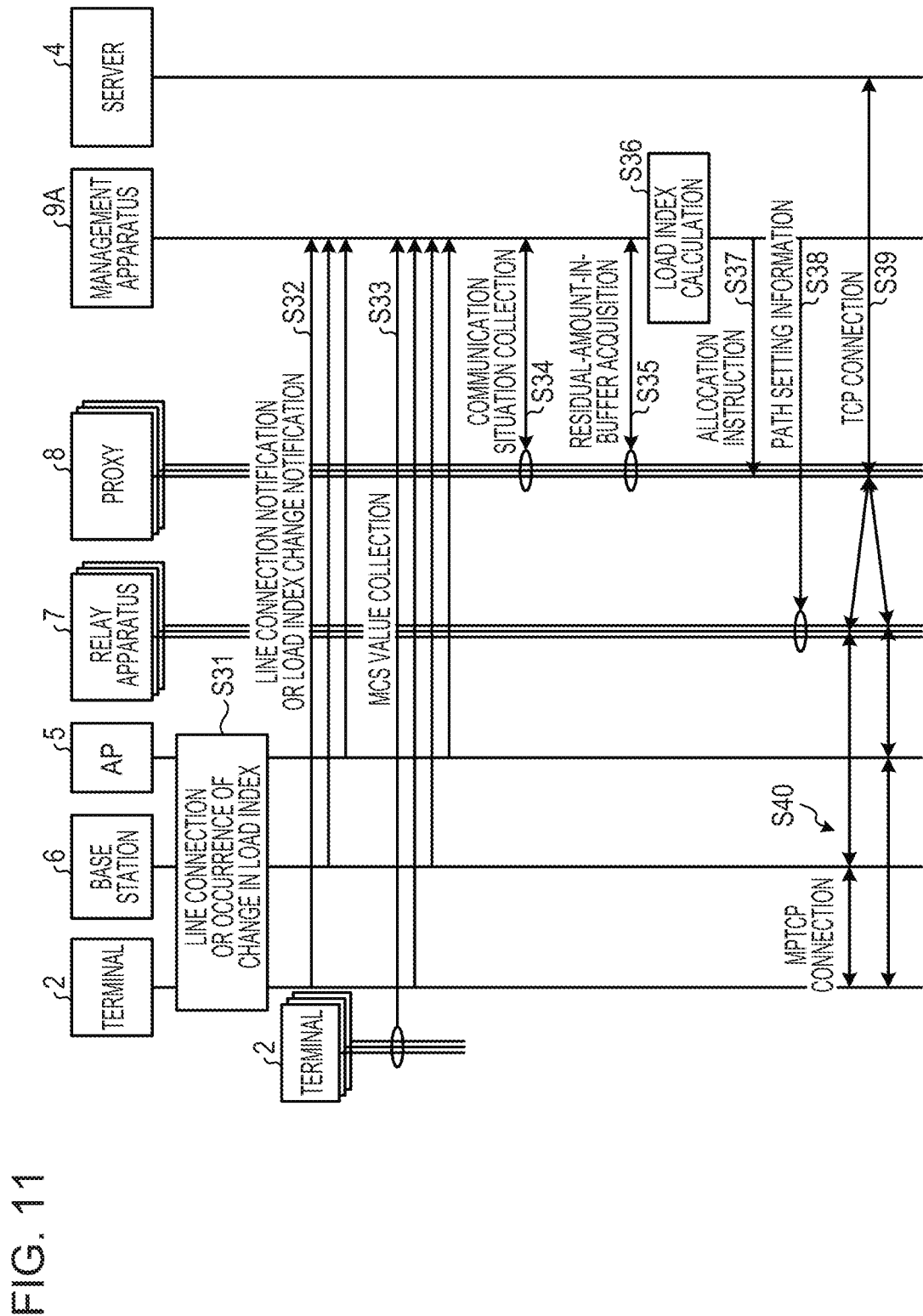
FIG. 11 is a sequence diagram illustrating an example of processing operation of a communication system that relates to second load distribution processing.

Next, operation of the communication system 1A according to the Second Embodiment is described. FIG. 11 is a sequence diagram illustrating an example of processing operation of the communication system 1A that relates to second load distribution processing.

In the case where the occurrence of the line connection or the load index change is detected, occurs (Operation S31), the terminal 2, the base station 6, or the AP 5 illustrated in FIG. 11 notifies the management apparatus 9A of the line connection notification or the load index change notification (Operation S32). In the case where the line connection notification or the load index change notification is received, the management apparatus 9A collects the MCS value of each line, which is used for the MPTCP connection, from the terminal 2, the base station 6, or the AP 5 (Operation S33).

The management apparatus 9A collects the communication situation of every terminal 2 being allocated, from each proxy 8 (Operation S34). The management apparatus 9A collects the amount of residual buffer of the transmission buffer 8B within each proxy 8 (Operation S35). Based on the MCS value of each line and the transmission efficiency of each line for every terminal 2, the management apparatus 9A calculates the load index of every terminal 2 (Operation S36).

Based on the load index of every terminal 2, the usage situation of every terminal 2, the situation of the allocation of the terminal 2 to every proxy 8, and the amount of residual buffer of the transmission buffer 8B within the proxy 8, the management apparatus 9A notifies each proxy 8 of the instruction that allocates the allocation-target terminal 2 (Operation S37). As a result, based on the allocation instruction, the management apparatus 9A allocates the allocation-target terminal 2 in non-communication, to each proxy 8 in order to equalize the sums of the load indexes of the terminals 2 that have been allocated to every proxy 8. The management apparatus 9A notifies the relay apparatus 7 of the path setting information, in order to indicate the path setting for every terminal 2 being allocated to each proxy 8 (Operation S38). As a result, based on the path setting information, each relay apparatus 7 sets optimal paths on the WLAN line and the LTE line, which are used for the MPTCP connection between the proxy 8 and the terminal 2.

The proxy 8 establishes the TCP connection between the proxy 8 itself and the server 4 (Operation S39). The proxy 8 establishes the TCP connection over the LTE line between the proxy 8 itself and the terminal 2 through the relay apparatus 7 and the base station 6, and establishes the TCP connection over the WLAN line between the proxy 8 itself and the terminal 2 through the relay apparatus 7 and the AP 5. As a result, the proxy 8 establishes the MPTCP connection over the WLAN line and the LTE line between the proxy 8 itself and the terminal 2 (Operation S40).

Figure 12:
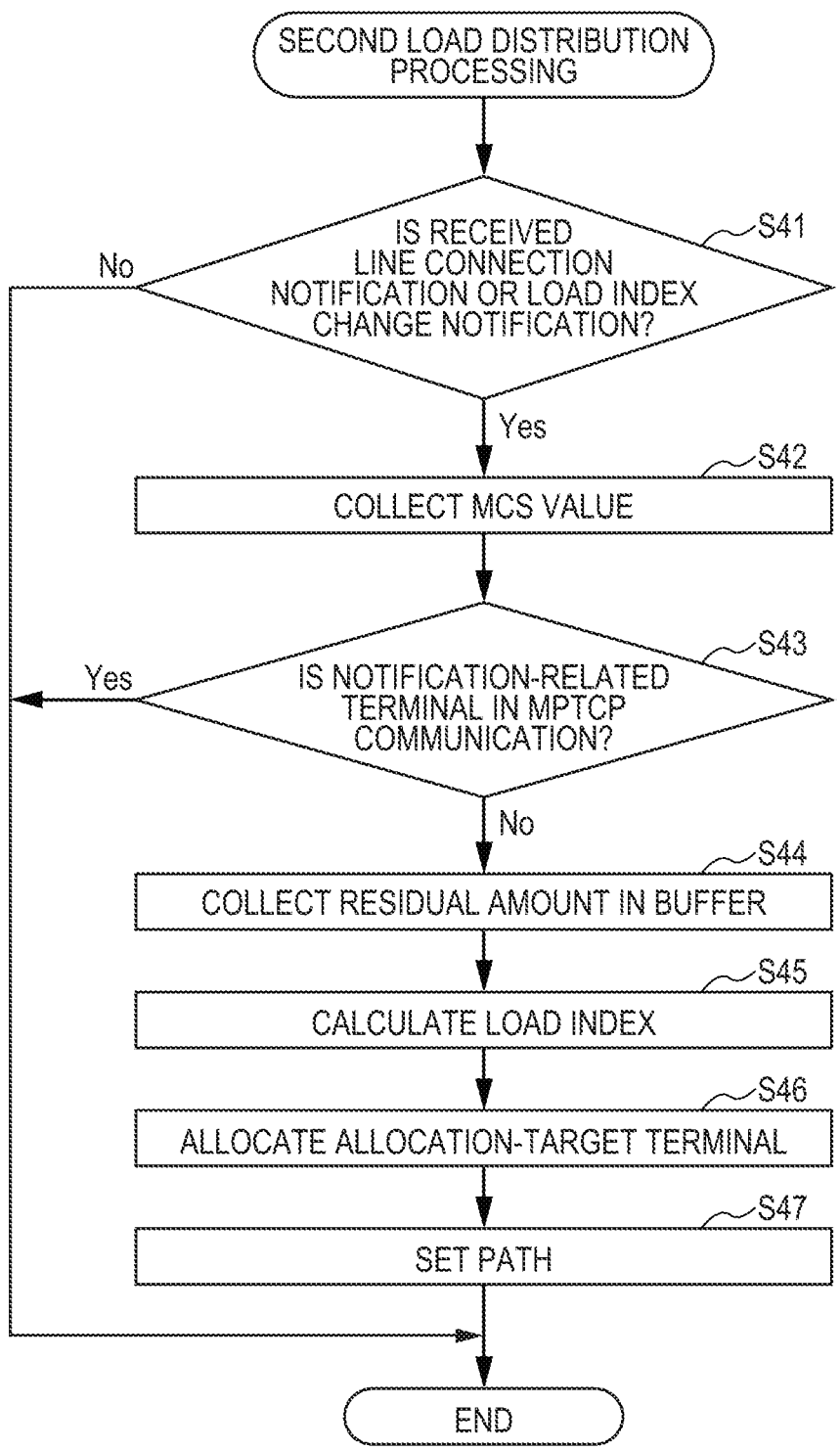
FIG. 12 is a flowchart illustrating an example of processing operation of a management apparatus that relates to the second load distribution processing.

FIG. 12 is a flowchart illustrating an example of processing operation of the management apparatus 9A that relates to the second load distribution processing. The reception unit 31 within the management apparatus 9A in FIG. 12 determines whether or not the line connection notification or the load index change notification is received (Operation S41). In the case where the line connection notification or the load index change notification is received (Yes in Operation S41), the collection unit 32 within the management apparatus 9A collects the MCS value of each line, which is used for the MPTCP connection for every terminal 2 within the communication system 1A (Operation S42).

The determination unit 33 within the management apparatus 9A determines whether or not the notification-related terminal 2 is in MPTCP communication (Operation S43). In a case where the notification-related terminal 2 is not in MPTCP communication (No in Operation S43), the residual-amount collection unit 37 within the management apparatus 9A collects the amount of residual buffer of the transmission buffer 8B within every proxy 8 (Operation S44). Based on the MCS value of every line for the terminal 2 and the transmission efficiency of every line, the second calculation unit 34A within the management apparatus 9A calculates the load index, as a line speed difference for the terminal 2 (Operation S45).

Based on the load index of every terminal 2, the usage situation of every terminal 2, the situation of the allocation of the terminal to every proxy 8, and the amount of residual buffer within every proxy 8, the allocation unit 35 within the management apparatus 9A allocates the allocation-target terminal 2 to each proxy 8 (Operation S46). As a result, based on the allocation instruction, the management apparatus 9A allocates the allocation-target terminal 2 in non-communication, to each proxy 8 in order to equalize the sums of the load indexes of the terminals 2 that have been allocated to every proxy 8. Based on the instruction that allocates the terminal 2, the path control unit 36 within the management apparatus 9A sets an optimal path that corresponds to the situation of the allocation of every terminal 2 to the proxy 8, for the relay apparatus 7 (Operation S47), and ends a processing operation illustrated in FIG. 12. In the case where the line connection notification or the load index change notification is not received (No in Operation S41), the reception unit 31 ends the processing operation illustrated in FIG. 12. In a case where the notification-related terminal 2 is in MPTCP communication (Yes in Operation S43), the determination unit 33 ends the processing operation illustrated in FIG. 12.

The management apparatus 9A calculates the line speed difference between the line speed obtained by multiplying the MCS value of the WLAN line for every terminal 2 by the transmission efficiency of the WLAN line, and the line speed obtained by multiplying the MCS value of the LTE line for every terminal 2 by the transmission efficiency of the LTE line, as the load index. The management apparatus 9A allocates the allocation-target terminal 2 in non-communication, to each proxy 8 such that the sums of the load indexes of the terminals 2 that are allocated to every proxy 8, to which the weighting is applied according to the amount of residual buffer within every proxy 8, are equalized among the proxies 8. As a result, because the amounts of residual buffer of the transmission buffers 8B are equalized while taking into consideration the amount of residual buffer of the transmission buffer 8B, the management apparatus 9A distributes the load among the proxies 8 and thus may increase the number of terminals that are accommodated in the proxy 8.

Next, an implementation of a communication system 1B in which a plurality of proxies 8 accommodate a large number of terminals 2 is described below as Third Embodiment.

Third Embodiment

Figure 13:
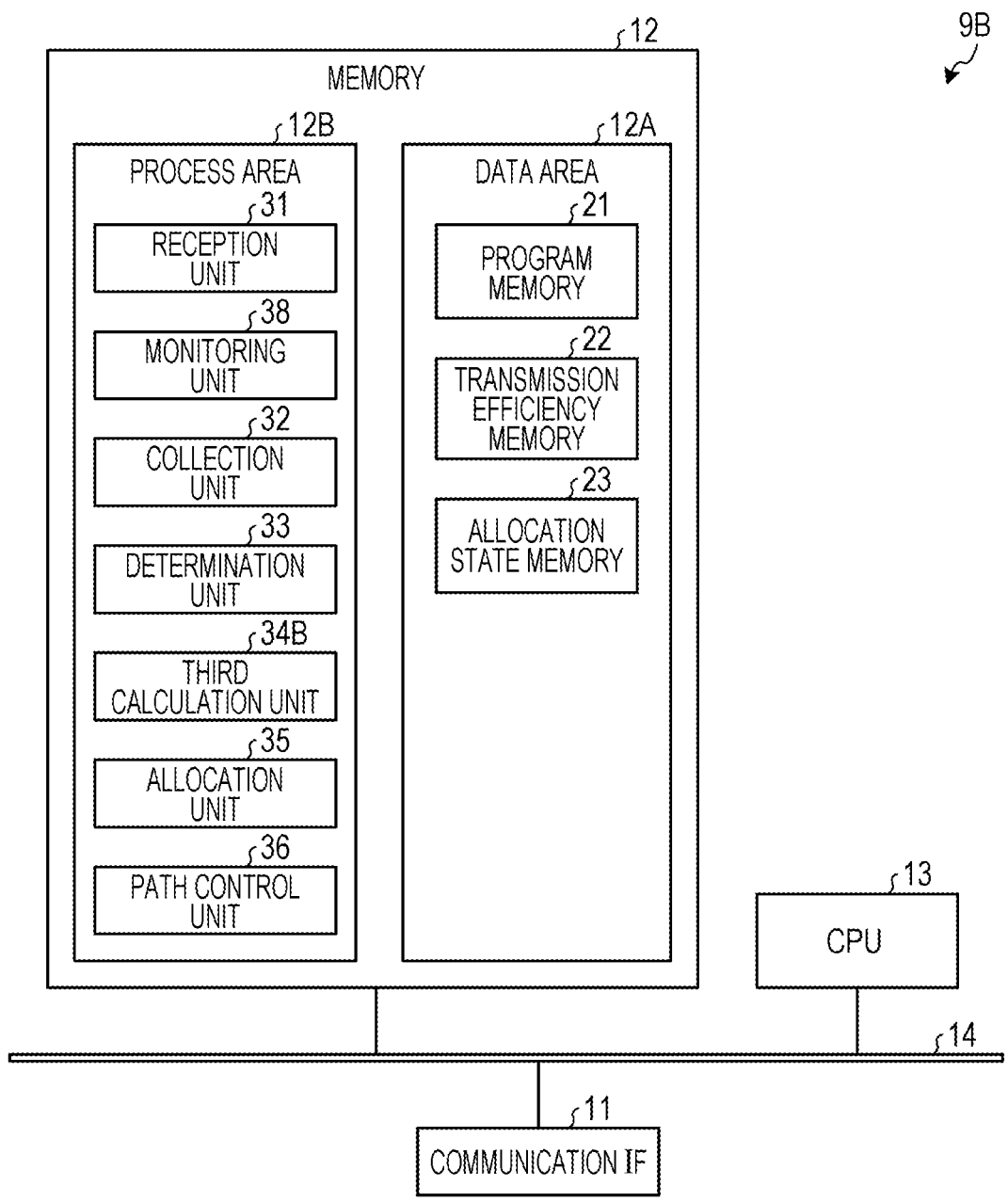
FIG. 13 is a block diagram illustrating an exemplary internal configuration of a management apparatus according to Third Embodiment.

FIG. 13 is a diagram illustrating an exemplary internal configuration of management apparatus 9B according to Third Embodiment. A configuration that is the same as that of the communication system 1 according to the First Embodiment is given the same reference numeral, and descriptions of overlapping configurations and operations are omitted.

In a case where the terminal 2 is in making a connection to a line, if the load index of the terminal 2 that has been allocated to the proxy 8 changes, or if a timer indicates that the time is up, the management apparatus 9B solves an optimization problem. The management apparatus 9B sets the minimization of the standard deviation of the sum of the load indexes of the terminals 2 that have been allocated to each proxy 8, to be an objection function, and sets all sets of allocation patterns in each of which the terminal 2 is allocated to each proxy 8, to be feasible solutions, thereby solving the optimization problem. The management apparatus 9B obtains the standard deviation of the sum of the load indexes of all sets of allocation patterns, and sets the allocation pattern in which the standard deviation is minimized, to be a solution. The management apparatus 9B allocates each terminal 2 that is the allocation-target, to each proxy 8, according to the allocation pattern that is a solution to the optimization problem of minimizing the standard deviation.

The process area 12B within the management apparatus 9B illustrated in FIG. 13 has a monitoring unit 38 and a third calculation unit 34B, in addition to the reception unit 31, the collection unit 32, the determination unit 33, the allocation unit 35, and the path control unit 36.

The monitoring unit 38 activates a timer, and determines whether or not the timer indicates that the time is up. In a case where the terminal 2 is in making a connection to a line, if the load index of the terminal 2 that has been allocated to the proxy 8 changes, or if the timer indicates that the time is up, the third calculation unit 34B solves the optimization problem.

Figure 16:
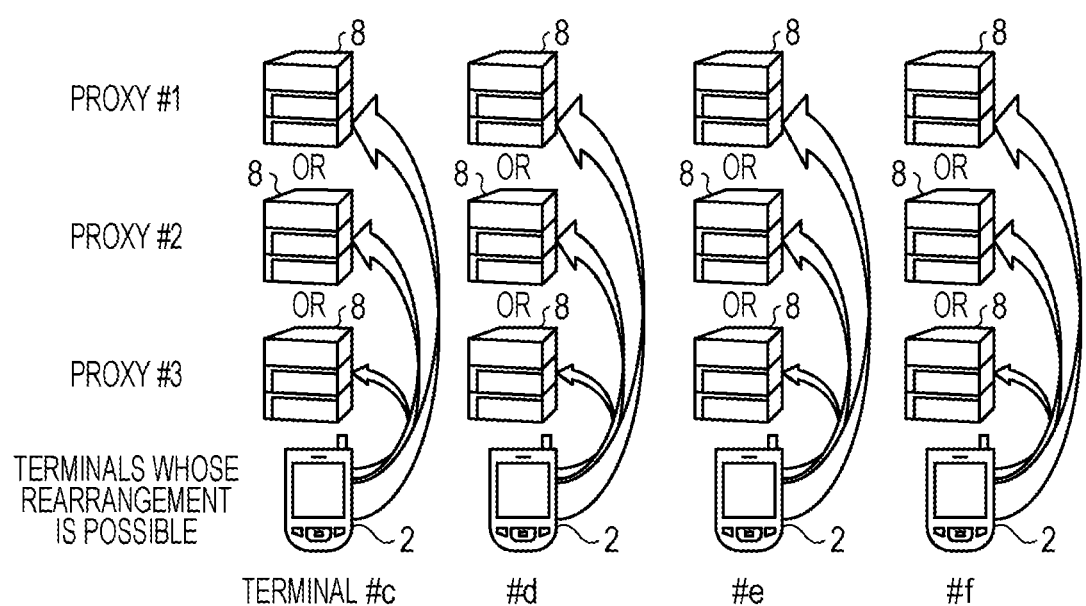
FIG. 16 is a diagram illustrating an exemplary allocation pattern relating to the third load distribution processing.

The third calculation unit 34B calculates the load index of the terminal 2, as the line speed difference, from the MCS value of every line and the transmission efficiency of every line, which are used for the MPTCP connection within the terminal 2. The third calculation unit 34B calculates the sum of the load indexes of the terminals 2 that are allocated to every proxy 8. The third calculation unit 34B sets the minimization of the standard deviation of the sum of the load indexes of each proxy 8, to be an objection function, and sets all sets of allocation patterns in each of which the terminal 2 is allocated to the proxy 8, to be feasible solutions, thereby solving the optimization problem. The third calculation unit 34B obtains the allocation pattern that is a solution to the optimization problem. As the solution to the optimization problem, the standard deviation of the sum of the load indexes of all combinations is obtained in a state where the terminals 2 whose rearrangement is possible are to be allocation targets, and sets the allocation pattern in which the standard deviation is minimized, to be a solution. FIG. 16 is a diagram illustrating an exemplary allocation pattern relating to third load distribution processing. The allocation-target terminals 2 whose rearrangement is possible, which are illustrated in FIG. 16, are the terminals 2 that are not in MPTCP communication, that is, terminals 2 # c, # d, # e, and # f that are in non-communication. The standard deviation of the sum of the load indexes of every allocation pattern in which the terminals 2 whose rearrangement is possible are allocated to the proxies 8 #1, #2, and #3, that is, the standard deviation of ProxyLoad#1,#2,#3 is obtained. The number of patterns of all combinations is the n-th power of the number of proxies, where n is the number of terminals 2 whose rearrangement is possible.

Figure 14:
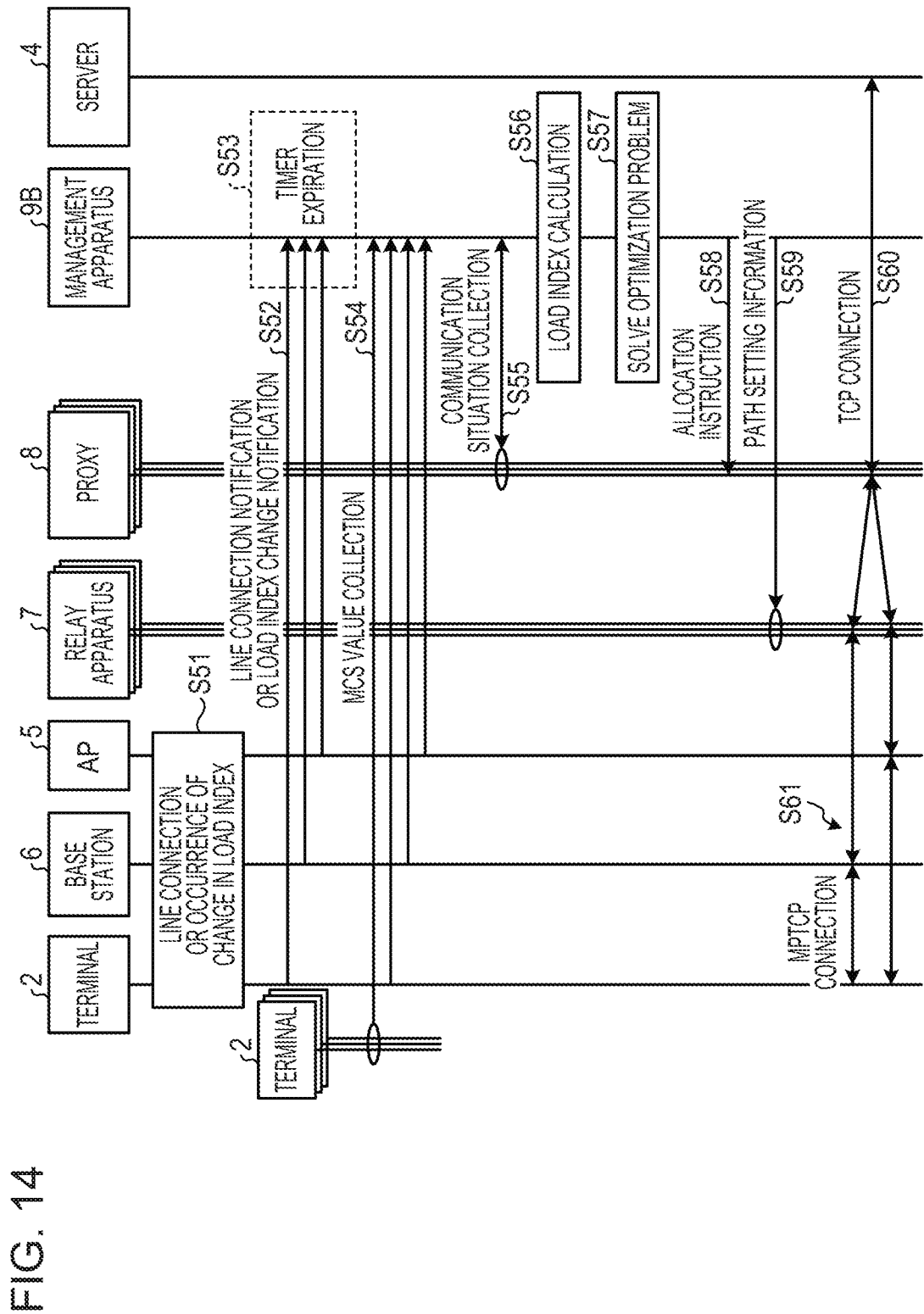
FIG. 14 is a sequence diagram illustrating an example of processing operation of a communication system that relates to third load distribution processing.

Next, operation of the communication system 1B according to the Third Embodiment is described. FIG. 14 is a sequence diagram illustrating an example of processing operation of the communication system 1B that relates to the third load distribution processing.

In FIG. 14, in the case where the occurrence of the line connection or the load index change is detected, occurs (Operation S51), the terminal 2, the base station 6, or the AP 5 notifies the management apparatus 9B of the line connection notification or the load index change notification (Operation S52). Furthermore, the management apparatus 9B determines whether or not the timer indicates that the time is up (Operation S53).

In the case where the line connection notification or the load index change notification is received, of in a case where the timer indicates that the time is up, the management apparatus 9B collects the MCS value of every line used for the MPTCP connection for the terminal 2, from the terminal 2, the base station 6, or the AP 5 (Operation S54). The management apparatus 9B collects the communication situation of every terminal 2 being allocated, from each proxy 8 (Operation S55). Based on the MCS value of each line and the transmission efficiency of each line, which are used for the MPTCP connection for every terminal 2, the management apparatus 9B calculates the load index of every terminal 2 (Operation S56).

Based on the load index of every terminal 2, the usage situation of every terminal 2, and the situation of the allocation of the terminal 2 to every proxy 8, the management apparatus 9B solves the optimization problem (Operation S57), and notifies each proxy 8 of an instruction that allocates the allocation pattern in which the standard deviation is minimized, and which indicates the solution to the optimization problem (Operation S58). As a result, based on the allocation instruction, the management apparatus 9B allocates the allocation-target terminal 2 in non-communication, to each proxy 8. The management apparatus 9B notifies the relay apparatus 7 of the path setting information indicating the path setting for every terminal 2 being allocated to each proxy 8 (Operation S59). As a result, based on the path setting information, each relay apparatus 7 sets optimal paths on the WLAN line and the LTE line, which are used for the MPTCP connection between the proxy 8 and the terminal 2.

The proxy 8 establishes the TCP connection between the proxy 8 itself and the server 2 (Operation S60). The proxy 8 establishes the TCP connection over the LTE line between the proxy 8 itself and the terminal 2 through the relay apparatus 7 and the base station 6, and establishes the TCP connection over the WLAN line between the proxy 8 itself and the terminal 2 through the relay apparatus 7 and the AP 5. As a result, the proxy 8 establishes the MPTCP connection over the WLAN line and the LTE line between the proxy 8 itself and the terminal 2 (Operation S61).

Figure 15:
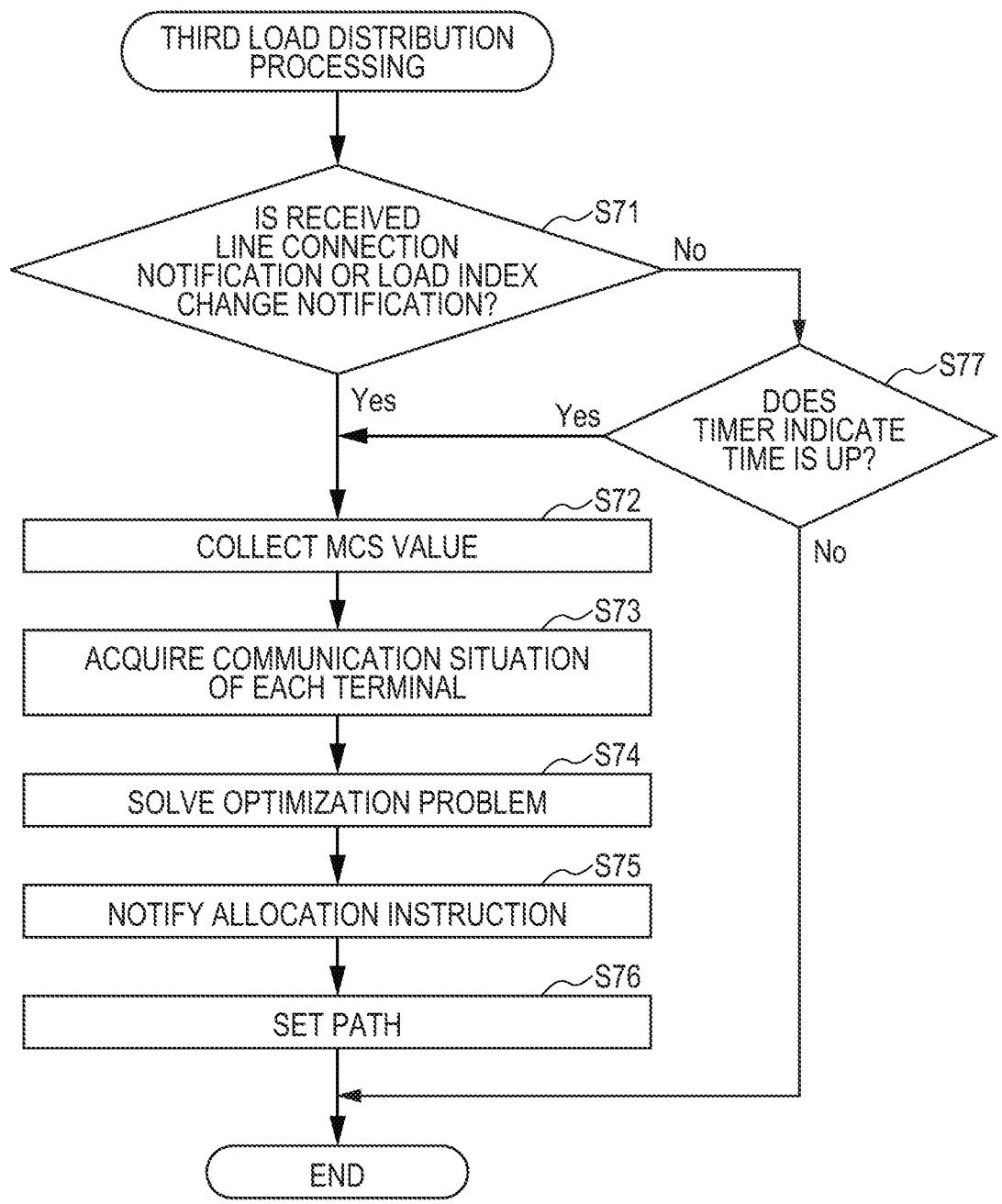
FIG. 15 is a flowchart illustrating an example of processing operation of a management apparatus that relates to the third load distribution processing.

FIG. 15 is a flowchart illustrating an example of processing operation of the management apparatus 9B that relates to the third load distribution processing. The reception unit 31 within the management apparatus 9B in FIG. 15 determines whether or not the line connection notification or the load index change notification is received (Operation S71). In the case where the line connection notification or the load index change notification is received (Yes in Operation S71), the collection unit 32 within the management apparatus 9B collects the MCS value used for the MPTCP connection over each line for every terminal 2 within the communication system 1B (Operation S72).

The determination unit 33 within the management apparatus 9B acquires a communication situation of each terminal 2 (Operation S73). The third calculation unit 34B within the management apparatus 9B solves the optimization problem, the solution to which is the allocation pattern in which the standard deviation of the sum of the load indexes of each proxy 8 is minimized (Operation S74). The allocation unit 35 within the management apparatus 9B notifies each proxy 8 of the allocation instruction that allocates the allocation pattern in which the standard deviation is minimized to each proxy 8 (Operation S75). As a result, the allocation unit 35 allocates the allocation-target terminal 2 to each proxy 8 such that the sums of the load indexes of the proxy 8 are equalized.

Based on the instruction that allocates the terminal 2, the path control unit 36 within the management apparatus 9B sets an optimal path that corresponds to the situation of the allocation of every terminal 2 to the proxy 8, for the relay apparatus 7 (Operation S76), and ends a processing operation illustrated in FIG. 15.

Furthermore, in a case where the line connection notification or the load index change notification is not received (No in Operation S71), the monitoring unit 38 within the management apparatus 9B determines whether or not the timer indicates the time is up (Operation S77). In a case where the timer indicates that the time is up (Yes in Operation S77), the monitoring unit 38 proceeds to Operation S72 in order to collect the MCS value of every line for each terminal 2. Furthermore, in a case where the timer does not indicate that the time is up (No in Operation S77), the monitoring unit 38 ends a processing operation illustrated in FIG. 15.

The management apparatus 9B according to the Third Embodiment calculates the load index as the line speed difference between the WLAN line and the line speed of the LTE line difference, which is used for the MPTCP connection for every terminal 2. The management apparatus 9B sets the minimization of the standard deviation of the sum of the load indexes of each proxy 8, to be an objection function, and sets all sets of allocation patterns in each of which each terminal 2 is allocated to the proxy 8, to be feasible solutions, thereby solving the optimization problem. Based on the allocation pattern in which the standard deviation of the sum of the load indexes is minimized, which is the solution to the optimization problem, the management apparatus 9B allocates the allocation-target terminal 2 to each proxy 8. As a result, because the amounts of used buffer of the transmission buffers 8A are equalized, the management apparatus 9B distributes the load among the proxies 8 and thus may increase the number of terminals that are accommodated in the proxy 8.

It is noted that, because the management apparatus 9B decided a suitable allocation destination that is the proxy 8, in a state where all terminals 2 that are in non-communication and whose rearrangement is possible are set to be allocation targets, the amount of used buffer of the transmission buffer 8A is more equalized than in the First Embodiment. As a result, the number of terminals that are accommodated in each proxy 8 may be efficiently increased.

The third calculation unit 34B within the management apparatus 9B according to the Third Embodiment calculates the sum of the load indexes of each proxy 8. However, the sum of the load indexes of every proxy 8, to which the weighting is applied according to the amount of residual buffer of the transmission buffer 8A, may be obtained, taking into consideration the amount of residual buffer of the transmission buffer 8A when the sum of the load indexes of each proxy 8 is calculated.

The management apparatus 9B according to the Third Embodiment may obtain a suitable allocation pattern in which the standard deviation of the sum of the load indexes is minimized, by solving the optimization problem, but when the number of proxies 8 and the number of terminals 2 whose rearrangement is possible increases, it takes time to calculate the sum of the load indexes. Accordingly, simulated annealing may be adopted as a method of obtaining an approximate allocation pattern, and an implementation in such a case is described below as Fourth Embodiment.

Fourth Embodiment

The third calculation unit 34B within the management apparatus 9B maps the allocation pattern in which the terminal 2 is allocated to the proxy 8, to "state" defined in the simulated annealing, and maps the standard deviation of the sum of the load indexes of the terminals 2 that have been allocated to every proxy 8, to "evaluation value" defined in the simulated annealing. As a result, the third calculation unit 34B may obtain the allocation pattern in which the terminal 2 is allocated to each proxy 8, as a solution provided by the simulated annealing.

Roughly speaking, in a certain trial, an allocation pattern in a next state is created as a state in the vicinity of an allocation pattern in a current state, and if an evaluation value is lower than in the current state (which means a more suitable solution), a next trial is performed with a next state as the current state. Although the evaluation value is not low, with a certain transition probability, there is also a case where a next state is set to be the current state. The transition probability is such that a solution does not converge to a local optimal solution in the vicinity of the current state. As "temperature" becomes lower, the transition probability transitions to a lower probability. Furthermore, as the number of trials increases, "temperature" becomes lower. More precisely, in a phase where the number of trials is small, transitioning occurs more frequently, but as the number of trials approaches the maximum number of trials, transitioning does not occur so much. Thus, it is assumed that a solution is obtained in the vicinity of the current state.

Figure 17:
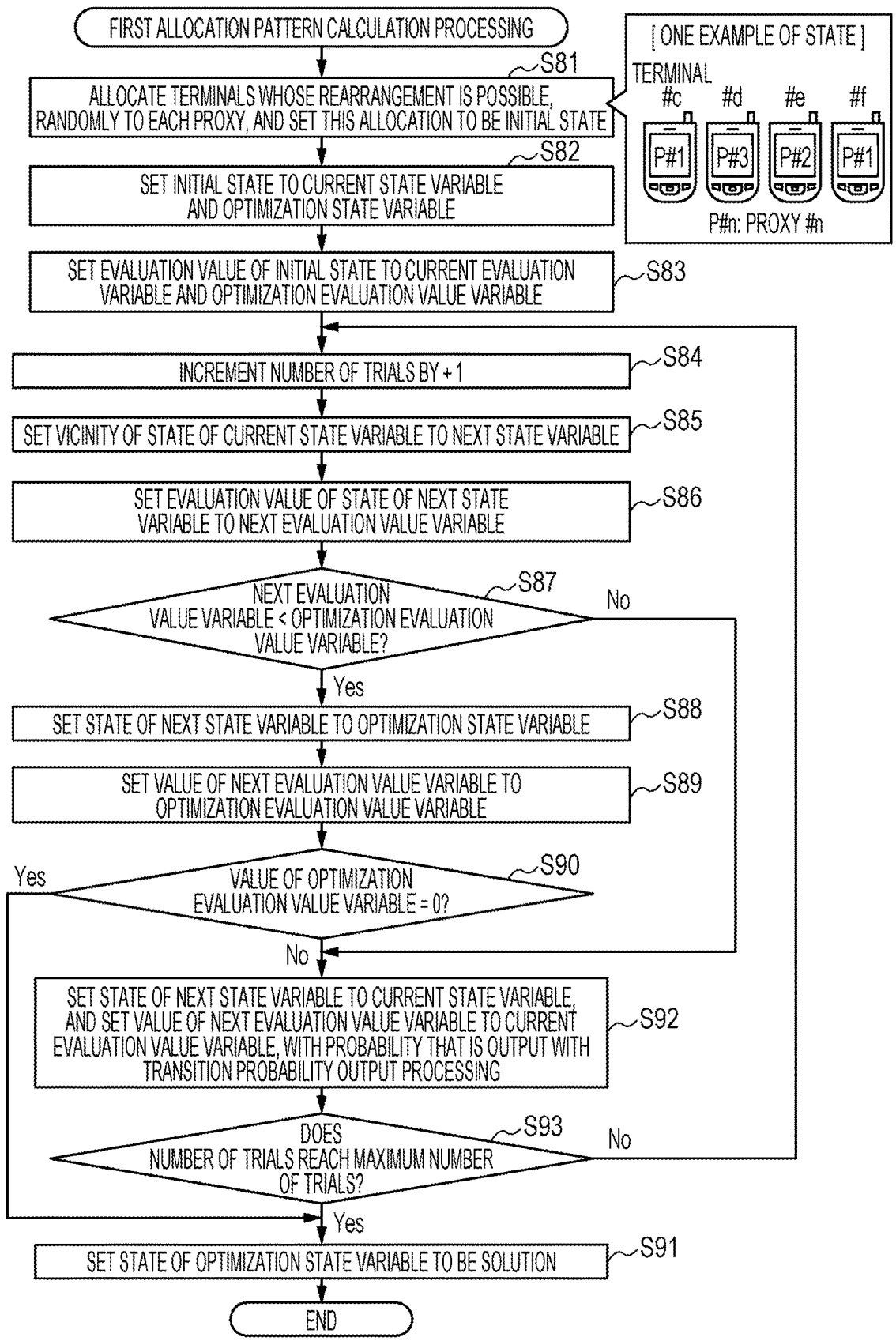
FIG. 17 is a flowchart illustrating an example of processing operation of a third calculation unit that relates to first allocation pattern calculation processing that uses simulated annealing according to Fourth Embodiment.

FIG. 17 is a flowchart illustrating an example of processing operation of the third calculation unit 34B that relates to first allocation pattern calculation processing that uses the simulated annealing according to Fourth Embodiment.

The third calculation unit 34B randomly allocates the terminals 2 whose rearrangement is possible, any of the proxies 8, and sets this allocation to be an initial state (Operation S81). As the initial state, the terminals 2 # c and # f are allocated to the proxy 8 #1, the terminal 2 # e to the proxy 8 #2, and the terminal 2 # d to the proxy 8 #3. The third calculation unit 34B sets the initial state to a current state variable and an optimization state variable (Operation S82). The current state variable and the optimization state variable each are variables that may store any one of the states. The current state variable is a variable that stores the current state. The optimization state variable is a variable that stores an optimal state at a current point in time.

The third calculation unit 34B sets an evaluation value of the initial state to a current evaluation value variable and an optimization evaluation value variable (Operation S83). The current evaluation value variable is a variable that stores an evaluation value of a state where the current state variable is stored. The optimization evaluation value variable is a variable that stores an evaluation value of a state where the optimization state variable is stored. Because the initial state is set to the current state variable and the optimization state variable in Operation S82, the third calculation unit 34B sets the evaluation value of the initial state. The evaluation value of the current state is assumed to be a standard deviation of the sum of the load indexes of the proxies 8 #1, #2, and so forth up to # n.

The third calculation unit 34B increments the number of trials by +1 (Operation S84). The maximum number of trials is a setting value. The third calculation unit 34B sets the vicinity of a state of the current state variable to a next state variable (Operation S85). The next state variable is a variable that stores a candidate state that has a likelihood of being a current state at the time of a next trial. Furthermore, in the state, the vicinity is assumed to be an allocation pattern in which the proxy 8 that is an allocation destination of the terminal 2 which is randomly selected is randomly selected. In the current state, for example, it is assumed that, in the state where the terminals 2 # c and # f are allocated to the proxy 8 #1, the terminal 2 # e to the proxy 8 #2, and the terminal 2 # d to the proxy 8 #3, the terminal 2 # d and the proxy 8 #1 are randomly selected. A next state in this case is a state in which the terminals 2 # c, # d, and # f, are allocated to the proxy 8 #1 and the terminal 2 # e to the proxy 8 #3.

The third calculation unit 34B sets an evaluation value of a state of the next state variable to the next evaluation value variable (Operation S86). The next evaluation value variable is a variable that stores an evaluation value of a state in which the next state variable is stored. The third calculation unit 34B determines whether or not a value of the next evaluation value variable is smaller than a value of the optimization evaluation value variable (Operation S87).

In a case where the value of the next evaluation value variable is smaller than the value of the optimization evaluation value variable (Yes in Operation S87), the third calculation unit 34B determines that the state of the next state variable stores an optimal state at a current point in time, and sets the state of the next state variable to the optimization state variable (Operation S88). Then, the third calculation unit 34B sets the value of the next evaluation value variable to the optimization evaluation value variable (Operation S89).

The third calculation unit 34B determines whether or not the value of the optimization evaluation value variable is 0 (Operation S90). In a case where the value of the optimization evaluation value variable is 0 (Yes in Operation S90), the third calculation unit 34B determines that the standard deviation is 0, that is, the sums of the load indexes of each proxy are equalized without any deviation, sets a state of the optimization state variable to be a solution (Operation S91), and ends a processing operation illustrated in FIG. 17.

In a case where the value of the optimization evaluation value variable is not 0 (No in Operation S90), the third calculation unit 34B determines that an optimal solution is not present. Then, with a transition probability that is output with transition probability output processing described below, the third calculation unit 34B sets the state of the next state variable to the current state variable, and sets the value of the next evaluation value variable to the current evaluation value variable (Operation S92).

Next, after the processing in Operation S92, the third calculation unit 34B determines whether or not the number of trials reaches the maximum number of trials (Operation S93). In a case where the number of trials reaches the maximum number of trials (Yes in Operation S93), the third calculation unit 34B proceeds to Operation S91 in order to set the state of the optimization state variable at a current point in time to be a solution. In a case where the number of trials does not reach the maximum number of trials (No in Operation S93), the third calculation unit 34B proceeds to Operation S84 in order to increment the number of trials by +1.

In a case where the value of the next evaluation value variable is not smaller than the value of the optimization evaluation value variable (No in Operation S87), with the transition probability output with the transition probability output processing, the third calculation unit 34B set the state of the next state variable to the current state variable, and sets the value of the next evaluation value variable to the current evaluation value variable. More precisely, the third calculation unit 34B proceeds to Operation S92.

Figure 18:
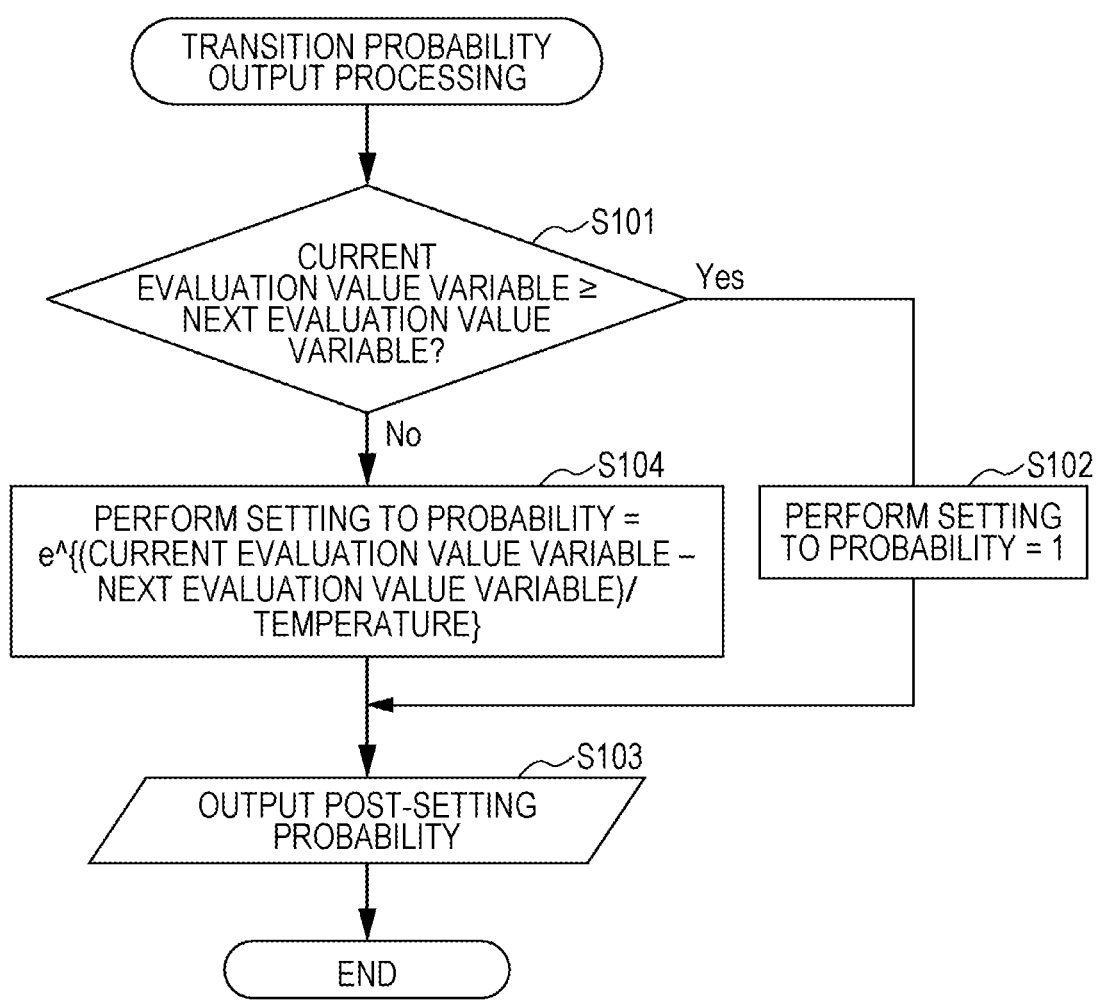
FIG. 18 is a flowchart illustrating an example of the processing operation of the third calculation unit that relates to transition probability output processing.

FIG. 18 is a flowchart illustrating an example of processing operation of the third calculation unit 34B that relates to the transition probability output processing.

The third calculation unit 34B in FIG. 18 determines whether or not the current evaluation value variable is equal to or smaller than the next evaluation value variable (Operation S101). In a case where the next evaluation value variable is equal to, or smaller than the current evaluation value variable (Yes in Operation S101), the third calculation unit 34B determines that the state of the next state variable is a more ideal solution than the state of the current state variable, and sets a probability to 1 such that the state of the next state variable is the state of the current state variable (Operation S102). Then, the third calculation unit 34B outputs a post-setting probability (Operation S103), and ends a processing operation illustrated in FIG. 18.

In a case where the next evaluation value variable is neither equal to, nor smaller than the current evaluation value variable (No in Operation S101), the third calculation unit 34B determines that the state of the next state variable is not a more ideal solution than the state of the current state variable. Then, the third calculation unit 34B sets a transition probability calculated using Expression (3) such that a solution does not converge to a local optimal solution in the vicinity of the current state (Operation S104). Then, the next state is set to be the current state. Then, the third calculation unit 34B proceeds to Operation S103 in order to output the post-setting transition probability.

$$\text{Probability} = e\wedge\left\{\frac{\text{current evaluation value variable} - \text{next evaluation value variable}}{\text{temperature}}\right\}$$

$$\text{Temperature} = \alpha\wedge\left\{\frac{\text{number of trials}}{\text{maximum number of trials}}\right\}$$

α is set to be in range of 0<α<1
e: base of natural logarithm . . . (3)

The management apparatus 9B according to the Fourth Embodiment determines an allocation destination the proxy 8 which is approximately ideal, in a short calculation time, in a state where the terminals 2 that are in communication other than in MPTCP communication, whose rearrangement is possible are set to be allocation targets. As a result, because the amounts of used buffer of the transmission buffers 8A are more equalized than in the First Embodiment, the number of terminals that are accommodated in each proxy 8 may be increased.

In the management apparatus 9B according to the Fourth Embodiment, the allocation pattern is obtained using the simulated annealing, but no limitation to the simulated annealing is imposed. For example, a genetic algorithm may be used. An implementation in such a case is described below as Fifth Embodiment.

Fifth Embodiment

The third calculation unit 34B within the management apparatus 9B maps the allocation pattern for the proxy 8 to which the terminal 2 is allocated, to "individual" defined with a genetic algorithm, and the terminal 2 that has the proxy 8 which is an allocation destination, to "gene" defined with the genetic algorithm. The third calculation unit 34B maps the reciprocal of the standard deviation of the sum of the load indexes of each proxy 8 to "fitness" defined with the genetic algorithm. As a result, the third calculation unit 34B obtains the allocation pattern in which each terminal 2 is allocated to each proxy 8, with a solution that results from the genetic algorithm.

Roughly speaking, the third calculation unit 34B creates a current generation as a set including N (setting value) allocation patterns (that is, individuals). An initial value is randomly created. The third calculation unit 34B performs crossing-over, mutation or copying based on a group of individuals that are included in a current generation, creates an individual in a next generation, and when the number of individuals in a next generation is N, increments the number of generations by +1, with the next generation as the current generation. The third calculation unit 34B performs this trial up to the maximum number of generations (setting values), and sets an individual that has highest fitness, in the current generation in which the last trial is performed, to be a solution.

Figure 19:
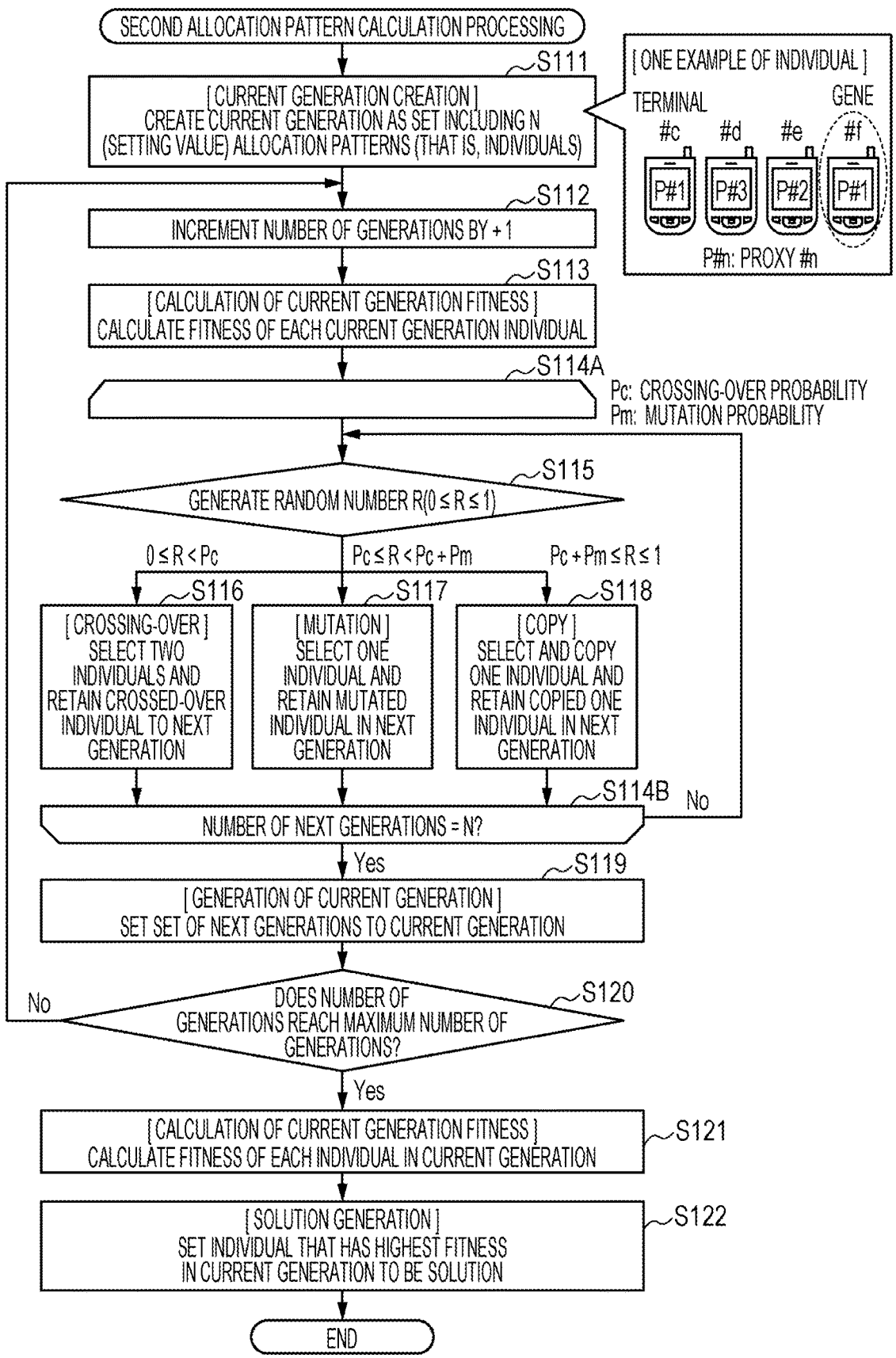
FIG. 19 is a flowchart illustrating an example of the processing operation of the third calculation unit that relates to second allocation pattern calculation processing that uses a genetic algorithm according to Fifth Embodiment.

FIG. 19 is a flowchart illustrating an example of processing operation of the third calculation unit 34B that relates to second allocation pattern calculation processing that uses a genetic algorithm according to Fifth Embodiment.

The third calculation unit 34B creates the current generation, as a set including N allocation patterns (that is, individuals) (Operation S111). N is assumed to be a setting value, and N allocation patterns are assumed to be randomly created. The allocation pattern, for example, is assumed to be a state in which the terminals 2 # c and # f are allocated to the proxy 8 #1, the terminal 2 # e, to the proxy 8 #2, and the terminal 2 # d to the proxy 8 #3. N individuals are created, and the N individuals, as a whole, constitute the current generation. One terminal 2 allocated to the proxy 8 that is an allocation destination constitutes one gene. The individual is constructed from a plurality of genes. One individual illustrated in FIG. 19, for example, is constructed from 4 genes.

The third calculation unit 34B increments the number of generations by +1 (Operation S112), and calculates the fitness of each individual in the current generation (Operation S113). The fitness is the reciprocal of the standard deviation of the sum of the load indexes of the proxy 8 to which each individual is allocated. The individual that has high fitness is suitable.

The third calculation unit 34B performs looping until the number of individuals that constitute the next generation is N (Operations S114A and S114B). The third calculation unit 34B generates a random number R (0≤R≤1) (Operation S115). The third calculation unit 34B compares a value of the random number R and values of a crossing-over probability (Pc) and a mutation probability (Pm), and performs any one of the crossing-over, the mutation, and the copying. The values of the crossing-over probability (Pc) and the mutation probability (Pm) are setting values.

Figure 20:
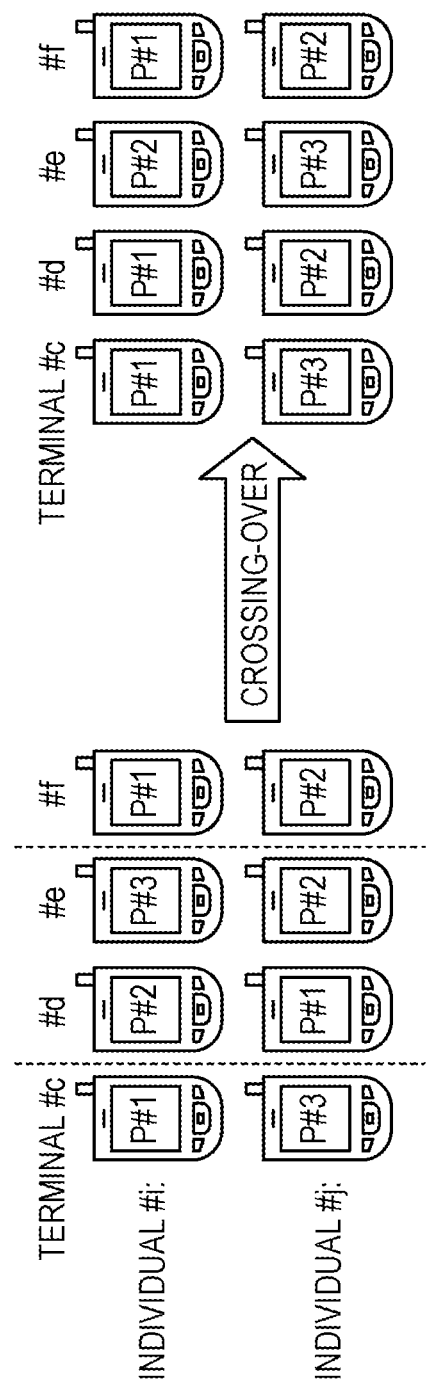
FIG. 20 is a diagram illustrating an example of crossing-over within a genetic algorithm.

In a case where the result of the comparison is that 0≤R<Pc, the third calculation unit 34B performs the crossing-over (Operation S116). With the crossing-over, two individuals are selected, and crossed-over individuals are retained in the next generation. When it comes to the selection of the two individuals, individuals of which the number (which is a setting value, for example, 10) is stipulated are extracted randomly from the current generation, and two individuals are finally selected from among the selected individuals, in order of decreasing the fitness. FIG. 20 is a diagram illustrating an exemplary crossing-over within the genetic algorithm. In an example in FIG. 20, individual #1 and individual j are selected, and two crossing-over points are randomly selected. In the example in FIG. 20, crossing-over points are set to be between the terminal 2 # c and the terminal 2 # d, and between the terminal 2 # e and the terminal 2 # f. Next, the terminals 2 that are interposed between the two crossing-over points change their positions. In the example in FIG. 20, the terminals 2 # d and # e, in individual #1, and the terminals 2 # d and # e, in individual # j change their positions. As a result, allocation destinations of the terminals 2 # c, # d, and # f in individual # i are the proxy 8 #1, and allocation destination of the terminals 2 # e in individual #1 is the proxy 8 #2. Furthermore, allocation destinations of the terminals 2 # c and # e in individual # j are the proxy 8 #3, and allocation destinations of the terminals 2 # d and # f in individual # j are the proxy 8 #2. As a result of the crossing-over, the two individuals are retained as the next generation.

Figure 21:
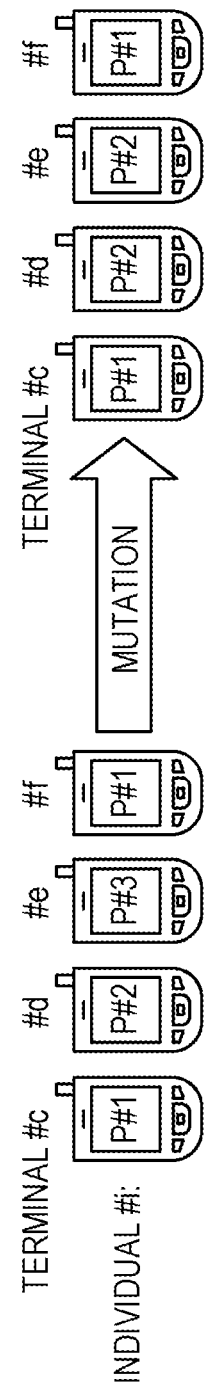
FIG. 21 is a diagram illustrating an example of mutation within the genetic algorithm.

In a case where the result of the comparison is Pc≤R<Pc+Pm, the third calculation unit 34B performs the mutation (Operation S117). With the mutation, one individual is selected, and the mutated individual is retained in the next generation. When it comes to the selection of one individual, individuals of which the number is stipulated are extracted randomly from the current generation, and then, one individual that has the highest fitness is finally selected, from among the extracted individuals. FIG. 21 is a diagram illustrating an exemplary mutation within the genetic algorithm. In an example in FIG. 21, individual # i is selected, and the proxy 8 that is an allocation destination of the terminal 2 which is randomly selected is randomly selected and is changed. In the example in FIG. 21, the terminal 2 # e and the proxy 8 #2, which is an allocation destination, are randomly selected. As a result, allocation destinations of the terminals 2 # c and # f, in individual # i are selected as the proxy 8 #1, allocation destination of the terminals 2 # d in individual # i is selected as the proxy 8 #2, and allocation destination of the terminals 2 # e in individual #1 is randomly selected as the proxy 8 #2. As a result of the mutation, one individual is retained as the next generation.

In a case where the result of the comparison is Pc+Pm≤R≤1, the third calculation unit 34B performs the copying (Operation S118). With the copying, one individual is selected, copied, and is retained in the next generation. When it comes to the selection of one individual, individuals of which the number is stipulated are extracted randomly from the current generation, and then, one individual that has the highest fitness is finally selected, from among the extracted individuals.

The third calculation unit 34B determines whether or not the number of individuals that constitute the next generation is N (Operation S114B). In a case where the number of individuals that constitute the next generation is not N (No in Operation S114B), the third calculation unit 34B proceeds to Operation S115 in order to generate the random number R. In a case where the number of individuals that constitute the next generation is N (Yes in Operation S114B), the third calculation unit 34B sets a set of next generations to the current generation (Operation S119). More precisely, the third calculation unit 34B causes an individual that constitutes the next generation to be an individual that constitutes the current generation.

The third calculation unit 34B sets the set of next generations to the current generation, and then determines whether the number of current generations reaches the maximum number of generations (Operation S120). In a case where the number of current generations does not reach the maximum number of generations (No in Operation S120), the third calculation unit 34B proceeds to Operation S112 in order to increment the number of generations by +1.

In a case where the number of current generations reaches the maximum number of generations (Yes in Operation S120), the third calculation unit 34B calculates the fitness of each individual in the current generation (Operation S121), sets an individual that has the highest fitness in the current generation, to be a solution (Operation S122), and ends a processing operation illustrated in FIG. 19.

The management apparatus 9B according to the Fifth Embodiment determines an allocation destination that is the proxy 8 which is approximately ideal, in a short calculation time, in the state where the terminals 2 that are in communication other than in MPTCP communication, whose rearrangement is possible are set to be allocation targets. As a result, because the amounts of used buffer of the transmission buffers 8A are more equalized than in the First Embodiment, the number of terminals that are accommodated in each proxy 8 may be increased.

There is a line that employs specifications in which the MCS value results from indexing combinations of, in addition to a wireless modulation type and a coding rate, a frequency bandwidth (a bandwidth of 20 MHz, a bandwidth of 40 MHz, or the like) used, a streaming number (1, 2, 3, 4, or the like) for multiple-input and multiple-output (MIMO), and the like. In the case of the line that employs the above specifications, the management apparatus 9 may calculate a speed of the line with the MCS value. In contrast, when it comes to an MCS, there is also a line that employs specifications that separately define a combination of the frequency bandwidth and the streaming number without including the frequency bandwidth and the streaming number in the MCS value. In the case of the line that employs the above specifications, the management apparatus 9 collects the MCS value, the frequency bandwidth and the streaming number, and may calculate the speed of the line, based on the MCS value, the frequency bandwidth, and the streaming number, which are collected.

In Embodiments described above, the LTE line and the WLAN line are illustrated as the MPTCP connection for every terminal, but no limitation to these is imposed, and a suitable change is possible.

Furthermore, constituent elements, such as the units that are illustrated, do not necessarily have to be configured physically as illustrated. That is, a specific aspect of distribution or integration of the units is not limited to the one illustrated, and one or several of or all of the units may be configured to be distributed or integrated functionally or physically on any per-unit basis according to various loads or usage situations.

One or several of, or all of the various functions for processing, which are performed in each device, may be made to be performed on a central processing unit (CPU) (or a microcomputer such as a micro processing unit (MPU), and a microcontroller unit (MCU)). Furthermore, it goes without saying that one or several of, or all of the various functions for the processing may be made to be performed on a program that is interpretation-executed by the CPU (or the microcomputer such as the MPU or the MCU), or on hardware that uses wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus configured to allocate a plurality of terminals to a plurality of proxy servers, the management apparatus comprising:
   a memory; and
   a processor coupled to the memory and the processor configured to:
   collect first line information of a first line and second line information of a second line, for a terminal of the plurality of terminals supporting the first line and the second line and allocated to a proxy server;
   calculate a speed difference between a first line speed of the first line and a second line speed of the second line, based on line speeds in accordance with the first line information and the second line information;
   determine a second terminal from the plurality of terminals to be allocated to a second proxy server of the plurality of proxy servers;
   calculate a load based on the speed difference of the terminal allocated to the proxy server;
   allocate the determined second terminal from the plurality of terminals to the second proxy server of the plurality of proxy servers, such that the load among the proxy servers is equalized;
   set minimization of a standard deviation of the speed difference for the terminal allocated to the proxy server, to be an objective function,
   set all sets of an allocation pattern in which an allocation-target terminal is allocated to the proxy server for each terminal, to be feasible solutions, and
   solve a problem of optimizing the allocation pattern in which the standard deviation is minimized.

2. The management apparatus according to claim 1,
   wherein the processor is further configured to:
   calculate the first line speed and the second line speed, based on line information and transmission efficiencies of each of the first line and the second line, the line information resulting from indexing a combination of a wireless modulation type and a coding rate, and calculate the speed difference based on the first line speed and the second line speed, the first line and the second line being established at a same time between the terminal and the proxy server.

3. The management apparatus according to claim 1, wherein the processor is further configured to:
collect, for each of the plurality of proxy servers, an amount of available space of a buffer in which transmission data is stored, and
allocate the determined second terminal to the proxy server, based on a sum of speed differences for terminals allocated to the proxy server and the amount of available space of the buffer in the proxy server.

4. The management apparatus according to claim 1, wherein the processor is further configured to:
determine whether or not the plurality of terminals are in communication by using the first line and the second line that are established, and
allocate a terminal in non-communication to the proxy server, based on the speed difference for the terminal in communication, which is allocated to the proxy server.

5. The management apparatus according to claim 1, wherein the processor is further configured to calculate the speed difference of the first line and the second line that are established between the terminal and the proxy server, when the terminal detects a connection to the first line or the second line, or when a terminal allocated to the proxy server detects a change in the speed difference for the terminal.

6. The management apparatus according to claim 1, wherein the processor is further configured to: set the allocation pattern to a state defined in simulated annealing, set the standard deviation to an evaluation value defined in the simulated annealing, and calculate the allocation pattern in which the standard deviation is minimized, as a solution provided by the simulated annealing.

7. The management apparatus according to claim 1, wherein the processor is further configured to: set the allocation pattern to be an individual defined in a genetic algorithm, set the terminal allocated to the proxy server, to be a gene defined in the genetic algorithm, set the standard deviation to be a fitness defined in the genetic algorithm, and calculate the allocation pattern in which the standard deviation is minimized, as a solution provided by the genetic algorithm.

8. A communication system comprising:
a plurality of terminals;
a plurality of proxy servers; and
a management apparatus configured to allocate the plurality of terminals to the plurality of proxy servers, the management apparatus including:
a memory; and
a processor coupled to the memory and the processor configured to:
collect first line information of a first line and second line information of a second line, for a terminal of the plurality of terminals supporting the first line and the second line and allocated to a proxy server;
calculate a speed difference between a first line speed of the first line and a second line speed of the second line, based on line speeds in accordance with the first line information and the second line information;
determine a second terminal from the plurality of terminals to be allocated to a second proxy server of the plurality of proxy servers;
calculate a load based on the speed difference of the terminal allocated to the proxy server;
allocate the determined second terminal from the plurality of terminals to the second proxy server of the plurality of proxy servers, such that the load among the proxy servers is equalized;
set minimization of a standard deviation of the speed difference for the terminal allocated to the proxy server, to be an objective function,
set all sets of an allocation pattern in which an allocation-target terminal is allocated to the proxy server for each terminal, to be feasible solutions, and
solve a problem of optimizing the allocation pattern in which the standard deviation is minimized.

9. An allocation method of a management apparatus configured to allocate a plurality of terminals to a plurality of proxy servers, the allocation method comprising:
collecting first line information of a first line and second line information of a second line, for a terminal of the plurality of terminals supporting the first line and the second line and allocated to a proxy server;
calculating a speed difference between a first line speed of the first line and a second line speed of the second line, based on line speeds in accordance with the first line information and the second line information;
determining a second terminal from the plurality of terminals to be allocated to a second proxy server of the plurality of proxy servers;
calculating a load based on the speed difference of the terminal allocated to the proxy server;
allocating the determined second terminal from the plurality of terminals to the second proxy server of the plurality of proxy servers, such that the load among the proxy servers is equalized;
setting minimization of a standard deviation of the speed difference for the terminal allocated to the proxy server, to be an objective function,
setting all sets of an allocation pattern in which an allocation-target terminal is allocated to the proxy server for each terminal, to be feasible solutions, and
solving a problem of optimizing the allocation pattern in which the standard deviation is minimized.

* * * * *